DATA PROCESSOR INPUT/OUTPUT CONTROL SYSTEM

Filed Nov. 30, 1962 20 Sheets-Sheet 1

INVENTORS.
HENRY RAYMOND HALLMAN
LEONARD H. SICHEL, JR.
CORNELIUS C. PERKINS
STANLEY J. PEZELY

Sept. 20, 1966 H. R. HALLMAN ETAL 3,274,561

DATA PROCESSOR INPUT/OUTPUT CONTROL SYSTEM

Filed Nov. 30, 1962 20 Sheets-Sheet 2

*INVENTORS.*
HENRY RAYMOND HALLMAN
LEONARD H. SICHEL, JR.
CORNELIUS C. PERKINS
STANLEY J. PEZELY

Sept. 20, 1966 H. R. HALLMAN ETAL 3,274,561

DATA PROCESSOR INPUT/OUTPUT CONTROL SYSTEM

Filed Nov. 30, 1962 20 Sheets-Sheet 3

*INVENTORS.*
HENRY RAYMOND HALLMAN
LEONARD H. SICHEL, JR.
CORNELIUS C. PERKINS
STANLEY J. PEZELY

*INVENTORS.*
HENRY RAYMOND HALLMAN
LEONARD H. SICHEL, JR.
CORNELIUS C. PERKINS
STANLEY J. PEZELY

| 1 12 | 13 16 | 17 20 | 21 24 | 25 36 | 37 38 | 39 44 | 45 48 |
|---|---|---|---|---|---|---|---|
| WORD COUNT 12 BITS | BLOCK COUNT 4 BITS | STATUS OF I/O MODULE 4 BITS | MEMORY MODULE ADDRESS 4 BITS | MEMORY LINE ADDRESS WITHIN MODULE 12 BITS | DEVICE STATUS 2 BITS | DEVICE NUMBER 6 BITS | ORDER CODE 4 BITS |

GENERAL FORMAT OF DESCRIPTOR WORD (48 BITS)

FIG.4A

| 1 11 | 12 | 13 24 | 25 31 | 32 | 33 36 | 37 43 | 44 48 |
|---|---|---|---|---|---|---|---|
| DESCRIPTOR BASE ADDRESS 11 BITS | 0 1BIT | 0000 0000 0000 12 BITS | 0000 000 7 BITS | 1 1BIT | 0000 | 0000 000 7 BITS | 10001 5 BITS |

WORD FORMAT OF SET-UP DESCRIPTOR

FIG.4B

| 1 12 | 13 16 | 17 20 | 21 24 | 25 36 | 37 38 | 39 43 | 44 45 | 46 48 |
|---|---|---|---|---|---|---|---|---|
| WORD COUNT 12 BITS | RECORD COUNT 4 BITS | X X X X | MEMORY MODULE ADDRESS 4 BITS | MEMORY LINE ADDRESS WITHIN MODULE 12 BITS | X X | DEVICE NUMBER 5 BITS | TYPE OF ORDER 2 BITS | MODIF. OF ORDER 3 BITS |

WORD FORMAT OF COMMAND DESCRIPTOR

FIG.4C

| 1 12 | 13 16 | 17 19 | 20 | 21 24 | 25 36 | 37 38 | 39 43 | 44 45 | 46 48 |
|---|---|---|---|---|---|---|---|---|---|
| WORD COUNT | RECORD COUNT | STATUS TO I/O CONTROL MODULE 000 | 0 | MEMORY MODULE ADDRESS | STARTING LINE OF MEMORY ADDRESS | 0 0 | DEVICE NUMBER | TYPE OF ORDER | MODIF. OF ORDER |

WORD FORMAT OF IN PROCESS DESCRIPTOR

FIG.4D

| 1 12 | 13 16 | 17 19 | 20 | 21 24 | 25 36 | 37 38 | 39 43 | 44 45 | 46 48 |
|---|---|---|---|---|---|---|---|---|---|
| FINAL WORD COUNT (# OF WORDS TO GO) | RECORD COUNT | STATUS I/O MODULE | STATUS OF PERIPH. DEVICE | MEMORY MODULE ADDRESS | ADDRESS OF LAST MEMORY LINE | STATUS PERIPH. DEVICE | DEVICE NUNBER | TYPE OF ORDER | MODIF. OF ORDER |

WORD FORMAT OF RESULT DESCRIPTOR

FIG.4E

*INVENTORS.*
HENRY RAYMOND HALLMAN
LEONARD H. SICHEL, JR.
CORNELIUS C. PERKINS
STANLEY J. PEZELY

DATA PROCESSOR INPUT/OUTPUT CONTROL SYSTEM

Filed Nov. 30, 1962 20 Sheets-Sheet 6

INVENTORS.
HENRY RAYMOND HALLMAN
LEONARD H. SICHEL, JR.
CORNELIUS C. PERKINS
STANLEY J. PEZELY

INVENTORS.
HENRY RAYMOND HALLMAN
LEONARD H. SICHEL, JR.
CORNELIUS C. PERKINS
STANLEY J. PEZELY

DATA PROCESSOR INPUT/OUTPUT CONTROL SYSTEM

Filed Nov. 30, 1962 20 Sheets-Sheet 8

INVENTORS.
HENRY RAYMOND HALLMAN
LEONARD H. SICHEL, JR.
CORNELIUS C. PERKINS
STANLEY J. PEZELY

INVENTORS
HENRY RAYMOND HALLMAN
LEONARD H. SICHEL, JR.
CORNELIUS C. PERKINS
STANLEY J. PEZELY

DATA PROCESSOR INPUT/OUTPUT CONTROL SYSTEM

Filed Nov. 30, 1962

20 Sheets-Sheet 10

INVENTORS.
HENRY RAYMOND HALLMAN
LEONARD H. SICHEL, JR.
CORNELIUS C. PERKINS
STANLEY J. PEZELY

INVENTORS.
HENRY RAYMOND HALLMAN
LEONARD H. SICHEL, JR.
CORNELIUS C. PERKINS
STANLEY J. PEZELY

| | | |
|---|---|---|
| | | 2000 |
| | | 2001 |
| FROM I/O MODULE #1 | LOCATION A – IN PROCESS DESCRIPTOR | 2002 |
| | LOCATION C – RESULT DESCRIPTOR | 2003 |
| FROM I/O MODULE #2 | LOCATION A – IN PROCESS DESCRIPTOR | 2004 |
| | LOCATION C – RESULT DESCRIPTOR | 2005 |
| FROM I/O MODULE #3 | LOCATION A – IN PROCESS DESCRIPTOR | 2006 |
| | LOCATION C – RESULT DESCRIPTOR | 2007 |
| FROM I/O MODULE #4 | LOCATION A – IN PROCESS DESCRIPTOR | 2008 |
| | LOCATION C – RESULT DESCRIPTOR | 2009 |
| FROM I/O MODULE #5 | LOCATION A – IN PROCESS DESCRIPTOR | 2010 |
| | LOCATION C – RESULT DESCRIPTOR | 2011 |
| FROM I/O MODULE #6 | LOCATION A – IN PROCESS DESCRIPTOR | 2012 |
| | LOCATION C – RESULT DESCRIPTOR | 2013 |
| FROM I/O MODULE #7 | LOCATION A – IN PROCESS DESCRIPTOR | 2014 |
| | LOCATION C – RESULT DESCRIPTOR | 2015 |
| FROM I/O MODULE #8 | LOCATION A – IN PROCESS DESCRIPTOR | 2016 |
| | LOCATION C – RESULT DESCRIPTOR | 2017 |
| FROM I/O MODULE #9 | LOCATION A – IN PROCESS DESCRIPTOR | 2018 |
| | LOCATION C – RESULT DESCRIPTOR | 2019 |
| FROM I/O MODULE #10 | LOCATION A – IN PROCESS DESCRIPTOR | 2020 |
| | LOCATION C – RESULT DESCRIPTOR | 2021 |
| | | 2022 |
| | | 2023 |

FIG. 10

*INVENTORS.*
HENRY RAYMOND HALLMAN
LEONARD H. SICHEL, JR.
CORNELIUS C. PERKINS
STANLEY J. PEZELY

Sept. 20, 1966 H. R. HALLMAN ETAL 3,274,561

DATA PROCESSOR INPUT/OUTPUT CONTROL SYSTEM

Filed Nov. 30, 1962 20 Sheets-Sheet 13

INVENTORS.
HENRY RAYMOND HALLMAN
LEONARD H. SICHEL, JR.
CORNELIUS C. PERKINS
STANLEY J. PEZELY

| 1 12 | 13 24 | 25 36 | 37 38 | 39 42 | 43 | 44 48 |
|---|---|---|---|---|---|---|
| 0000 0000 0000 | 0000 0000 0000 | 0000 0000 0000 | 0 0 | I/O CONTROL MODULE # TO BE RELEASED | 0 | 10000 |

WORD FORMAT OF RELEASE DESCRIPTOR

FIG.4F

COMMAND DESCRIPTOR TYPES (FOUR)

| | | TYPE OF INSTRUCTION | | MODIFICATION OF INSTRUCTION | | |
|---|---|---|---|---|---|---|
| TYPES | BITS→ | 44 | 45 | 46 | 47 | 48 |
| 1 SIMPLE OUTPUT WRITE DEVICE | | 0 | 0 | 0<br>0<br>0<br>0<br>1<br>1<br>1<br>1 | 0<br>0<br>1<br>1<br>0<br>0<br>1<br>1 | 0<br>1<br>0<br>1<br>0<br>1<br>0<br>1 |
| 2 COMPLEX WRITE DEVICE | | 0 | 1 | 0<br>0<br>0<br>0<br>1<br>1<br>1<br>1 | 0<br>0<br>1<br>1<br>0<br>0<br>1<br>1 | 0<br>1<br>0<br>1<br>0<br>1<br>0<br>1 |
| 3 SIMPLE INPUT READ | | 1 | 0 | 0<br>0<br>0<br>0<br>1<br>1<br>1<br>1 | 0<br>0<br>1<br>1<br>0<br>0<br>1<br>1 | 0<br>1<br>0<br>1<br>0<br>1<br>0<br>1 |
| 4 COMPLEX READ DEVICE | | 1 | 1 | 0<br>0<br>0<br>0<br>1<br>1<br>1<br>1 | 0<br>0<br>1<br>1<br>0<br>0<br>1<br>1 | 0<br>1<br>0<br>1<br>0<br>1<br>0<br>1 |

Type 3 codes:
- 000 ← ONLY USED FOR RELEASE DESCRIPTOR
- 001 ← ONLY USED FOR SET-UP DESCRIPTOR
- 010 ← ONLY CODE FOR THIS DEVICE
- 011 ← ONLY USED TO INITIATE ACTION-NOT TRANSFER
- 100–111 ← NOT USED

FIG.12

INVENTORS.
HENRY RAYMOND HALLMAN
LEONARD H. SICHEL, JR.
CORNELIUS C. PERKINS
STANLEY J. PEZELY

INVENTORS.
HENRY RAYMOND HALLMAN
LEONARD H. SICHEL, JR.
CORNELIUS C. PERKINS
STANLEY J. PEZELY

DATA PROCESSOR INPUT/OUTPUT CONTROL SYSTEM

Filed Nov. 30, 1962 20 Sheets-Sheet 16

INVENTORS.
HENRY RAYMOND HALLMAN
LEONARD H. SICHEL, JR
CORNELIUS C. PERKINS
STANLEY J. PEZELY

*INVENTORS.*
HENRY RAYMOND HALLMAN
LEONARD H. SICHEL, JR.
CORNELIUS C. PERKINS
STANLEY J. PEZELY

INVENTORS.
HENRY RAYMOND HALLMAN
LEONARD H. SICHEL, JR.
CORNELIUS C. PERKINS
STANLEY J. PEZELY

INVENTORS.
HENRY RAYMOND HALLMAN
LEONARD H. SICHEL, JR.
CORNELIUS C. PERKINS
STANLEY J. PEZELY

*INVENTORS.*
HENRY RAYMOND HALLMAN
LEONARD H. SICHEL, JR.
CORNELIUS C. PERKINS
STANLEY J. PEZELY

United States Patent Office 3,274,561
Patented Sept. 20, 1966

3,274,561
DATA PROCESSOR INPUT/OUTPUT CONTROL SYSTEM

Henry Raymond Hallman, Norristown, and Leonard H. Sichel, Jr., Bryn Mawr, Pa., Cornelius C. Perkins, Birmingham, Mich., and Stanley J. Pezely, Norristown, Pa., assignors to Burroughs Corporation, Detroit, Mich., a corporation of Michigan Filed Nov. 30, 1962, Ser. No. 241,421
27 Claims. (Cl. 340—172.5)

This invention relates to a data processing system and more particularly to the selection and control of peripheral devices in the input-output portion of a data processing system.

Most computing systems used today are organized around a single digital computer which will process the program serially, that is, one program step after another. A single computer system can be very efficient because its essential equipment is generally in operation. Considerable time can be saved through careful scheduling; repetitions can be avoided or limited by arranging the program schedule to allow later routines the use of earlier computations.

A major problem exists in that in a single computer system a changing or growing work load will over-burden the system. This is caused by the system's inability to adapt to such a growing work load. For example, too small a work load or too simple a problem will result in a waste of computing power; too large a work load, and back log piles up. Major element failures can shut down the entire system. However, the single computer system can be tailored to specific needs of a particular application to delay obsolescence. It is also possible to build in capacity to satisfy later growth, but this is done at considerable expense in initial efficiency. Sooner or later with normal growth, a point will be reached where the computer will become saturated. It is at this time that the total work load cannot be processed in the time available.

The obvious solution to this problem of system saturation is, of course, the brute force approach. This would be merely the addition of another computer to divide the work load. If individual programs in the work load are unrelated, the multi-computer installation will be quite effective, and has been, in fact, exploited in many variations.

A disadvantage of the multi-computer approach, however, is that it doesn't permit interrelated simultaneous processing. Each computer is responsible for its own set of programs; neither its computing time nor its memory space is available to other computers in the system. When concurrent computer operations are scheduled; program segments or complete programs frequently must be repeated because it is almost impossible to transfer data between the computers during operation. If we are given equal capacity, the single computer system, although slower, is far more efficient. It will, in fact, complete a typical set of programs in much less computer operating time than is required by two computers in a multi-computer configuration.

A second solution is to make more effective use of computing power available; the scheduling task can be performed by a master computer which assigns program segments to a number of subservient, or slave computers. Existing systems of this kind employ a partially shared memory so that important data and results processed by one computer can be made available to the others. This complicated approach permits closely integrated parallel computing, adapts readily to a growing work load, and eliminates repetition of programs and program segments.

The semi-modular system which has been described above has a major disadvantage. That is, the dependency of the entire system on a master computer. Even though it is as large as, or larger than its slaves, the master computer does not share in the work load. Thus, in the semi-modular computing system, while eliminating one source of inefficiency, it introduces another—a complex specialized piece of hardware which will work only a small portion of the time. This system's biggest detriment, however, is its vulnerability—failure of the master control computer. Such a failure will disable the entire system, often catastrophically.

The present inventive system is a unique portion of a novel data processing system which system is being disclosed in a separate, concurrent application entitled "Modular Computer System," by J. Anderson, S. Pezely, P. A. Hoffman, J. Shifman, L. Mott and J. Wilkinson, and assigned to the same assignee as the present application. The subject matter of that application is incorporated herein by reference for a complete description of the entire data processing system within which this invention operates.

The entire system will be briefly described to better orient the unique portion which will be disclosed herein in detail. The data processing system is composed of independent, interconnected modules which function as memories, processors, or input-output control modules. The system capacity is easily expanded by inserting additional identical modules. Thus, growth is quickly and inexpensively achieved compared to the usual related cost of reprogramming or replacing existing equipment.

The complete system allows the attainment of a truly parallel processing operation because each processor module has access to each and every memory module. The processor module processes data and performs arithmetic operations in a series parallel manner at multi-megacycle speeds. Each processor module has its own clock and operates asynchronously with other processors. A number of thin-film storage registers and an operand bank memory are included in each processor module and operate at the system clock rate. This greatly reduces the number or required accesses to the main memory modules.

The memory module in this data processing system provides a totally shared system memory which has been designed for flexible adaptation to many memory techniques.

The input-output control module, which is the heart of the proposed invention, provides control signals, parity checks, time interface, and data transformations for input-output devices. Briefly, it consists of an instruction register and associated decoding circuitry, a data register, and a manipulation register with associated timing circuits. Each control module is capable of controlling any standard peripheral device of the input-output complement. There can be as many simultaneous input-output operations as there are input-output control modules. A matrix-type input-output exchange automatically connects the control modules with any of the input-output devices on command from the processor modules. The input-output control modules also provides a constant input and output interface for universal ease of expansion.

It is the purpose of the present application to explain in detail the invention, including the input-output portion of the data processing system described above.

As has been mentioned, the selection and control of peripheral devices of a digital computer has generally been accomplished by a central processor of the computer.

One way in which this was done was to interrupt the operation of the processor during program execution of arithmetic manipulation. Then, to transfer the operation of the processor to the selection and control of various transfers of information between the memory and the input-output devices.

Because of the comparatively slow speed of each, these peripheral devices and the large amounts of information that requires transfer, the processor spends considerable time away from its primary function of arithmetic processing and program execution. Of course, this lengthens the time required to execute any program. Consequently, as the work load is increased, the point is reached where the time required to execute a program is not possible within the time specified for such program execution.

The second means of input-output control previously discussed was the utilization of a separate processor whose only function was to operate in the input-output selection and control mode. Such a processor was known as a synchronizing unit or synchronizer. This solution, while perfectly acceptable operationally, was an expensive answer to the problem of concurrent control and program execution. Thus, in addition to being penalized by the increased cost of two complete processors, a reduction in efficiency of each of the processors was realized.

A further disadvantage, common to both of the above solutions, was the requirement of a separate control device needed to operate each peripheral device. This was necessary since the input interface of any particular peripheral device was usually completely different from a companion peripheral device. Thus, while a processor could select and control the flow of information between the memory and the peripheral devices, the unique interface, which each device possessed, required the addition of a separate control device associated with each of the individual peripheral devices. In addition, both of the above solutions required a means for switching the output of the central processor from one peripheral device to another. This was necessary since all communication was through the central processor. Consequently, the processor output had to be switched to the input of each selected device with which it was to communicate. Finally, the most serious disadvantage was the fact that the processor had to remain connected to the selected peripheral device so long as the device was in communication with the memory.

It was this disadvantage that reduced the overall system efficiency, since during the period the processor was tied between the memory and the peripheral device, the processor was unable to continue program execution or arithmetic manipulation.

The present invention overcomes the above disadvantages. Primarily, it increases the efficiency of the overall processing system. The solution is accomplished without substantial increase in cost.

Further, the reliability of the system has increased by the utilization of the repetitive modules of identical design. Not only are memory modules identical, but the input-output controls modules as well. The proposed concept uses a plurality of separate memory modules to comprise the main memory. Thus, rather than being limited to memory communication through a single memory access, it becomes possible to have simultaneous access to a number of various memory modules which comprise the overall main memory. Next, these various memory modules process numerous separate but simultaneous outputs. As a consequence, it is possible to have simultaneous memory communication with a number of peripheral devices; provided of course, there are multiple input-output control modules available as intermediate means. Input-output control modules are provided by the present invention which possess universal characteristics enabling them to simultaneously communicate with any peripheral device as well as any memory module in this system.

A single control module can only communicate with one peripheral device at any one time. Hence, to have simultaneous peripheral device operation, it is merely necessary to have additional universal control modules.

In order to have harmonious interconnection between the fixed output interface of a universal input-output control module and the various peripheral devices of the system, a coupling unit is necessary. This coupling unit will be referred to herein as a peripheral transposer or merely a transposer. While each transposer unit poses a fixed interface to the output bus of the control module, it is necessary to differentiate between the peripheral device feeding information into the system from one being fed information from the system. The former is referred to as a Simple Input device, the latter a Simple Output device.

In the event that the peripheral device is capable of receiving as well as transmitting information, it will be specified as a Complex device. A Complex device is basically a combination of a Simple Input and a Simple Output device. Since all peripheral devices may be characterized into one of these three basic groups, it is necessary to create a transposer unit for each such group. Therefore, there are three types of basic transposer devices. They are: the Simple Input Transposer, the Simple Output Transposer, and the Complex Transposer.

It is the object of this invention to provide an input-output system for a data processor which does not require a central processor after an input-output operation has been initiated by a central processor of the data processing system.

It is a further object of this invention to provide an input-output system of a data processor which can decrease the program execution time thereby increasing its work load efficiency capabilities, by increasing the number of input-output control modules.

It is still a further object of this invention to provide an input-output module having universal characteristics.

It is a still further object of this invention to provide an input-output system in which the main memory can maintain direct communication with an input-output control module without need of the central processor after initial communication has been created by the central processor of the data processing system.

It is still a further object of this invention to provide an input-output control system in which simultaneous memory access is possible for a number of input-output operations.

It is still a further object of this invention to provide an input-output control system which is capable of resolving on a priority basis simultaneous memory access requests for the same memory module.

It is still a further object of this invention to provide an input-output control system in which multiple universal input-output control modules can be utilized to enable simultaneous communication between a plurality of memory modules and a plurality of peripheral devices.

It is still a further object of this invention to provide an input-output control system exchange network which enables the input-output control module to communicate with any peripheral device not being presently used.

It is still a further object of this invention to provide an input-output system which harmoniously couples any input output control module to any peripheral device.

It is still a further object of this invention to provide an input-output control system having an input-output control module which will indicate to the central processor that a result has been reached by a particular peripheral device.

It is still a further object of this invention to provide an input-output control module capable of overlap operation enabling it to receive new peripheral information without having completed the transmittal of prior peripheral information.

It is still a further object of this invention to provide an input-output control module capable of selecting from a plurality of identical input-output Control Modules the one which has been idle and has the lowest sequential number.

It is still a further object of this invention to provide an input-output control module capable of selecting any one of a plurality of peripheral devices which have been alternately listed as input (odd) and output (even) devices.

It is still a further object of this invention to provide an input-output control module capable of a high degree of peripheral versatility wherein said peripheral devices may be changed from single input devices or single output devices to devices utilizing both input and output information.

It is still a further object of this invention to provide input-output control module capable of communicating to the memory information regarding the status of the peripheral devices.

It is still a further object of this invention to provide an input-output control module capable of continuously relocating memory information by giving each transfer a base address and modifying the base address to relocate each memory transfer.

It is still a further object of this invention to provide an input-output control module capable of storing Control and checking Parity Information within the Input-Output Module.

It is still a further object of this invention to provide an input-output control module capable of having peripheral devices introduce control information for use by the input-output system.

Various other objects and advantages will appear in the following description of one embodiment of the invention, and the novel features will be particularly pointed out hereinafter in connection with the appended claims. Briefly, the present invention therefore, provides a means by which the central processor need only initiate an input-output operation. Thereafter the central processor will return to its primary function of processing (normal mode), and the initiated input-output operation will be under the continued control of a universal input-output control module. Upon completion of such input-output operation, the input-output control module will interrupt the central processor enabling the central processor to thereafter initiate a further input-output operation (control mode). It is seen therefore that the processor will operate in either the "normal" or "control" mode. The normal mode being the time during which it is performing its primary processing function. The interruption of this function is occasioned by the completion of any peripheral operation. The processor is then said to be in its control mode during this period of peripheral operation initiation. The initiation of an input-output operation by the central processor will comprise a command in which a complete description of the particular operation to be performed is included. It is this descriptive command, hereinafter referred to as a descriptor, which enables the universal input-output control module to continue the control of the particular input-output operation after the central processor of the system has returned to its primary processing function.

The invention itself, however, both as to organization and method of operation, together with further objects and advantages thereof, may best be understood by reference to the following description taken in connection with the drawings wherein:

FIG. 1 includes FIGURES 1A and 1B and when taken together is a block diagram of a data processing system having an input-output control configuration as envisioned by the preferred embodiment of the present invention;

FIGURE 1C provides a definitive table of legends for use with FIGURES 1A and 1B;

FIGS. 4A to 4F are the formats of various descriptor words;

Figures 1, 1A, 1C:
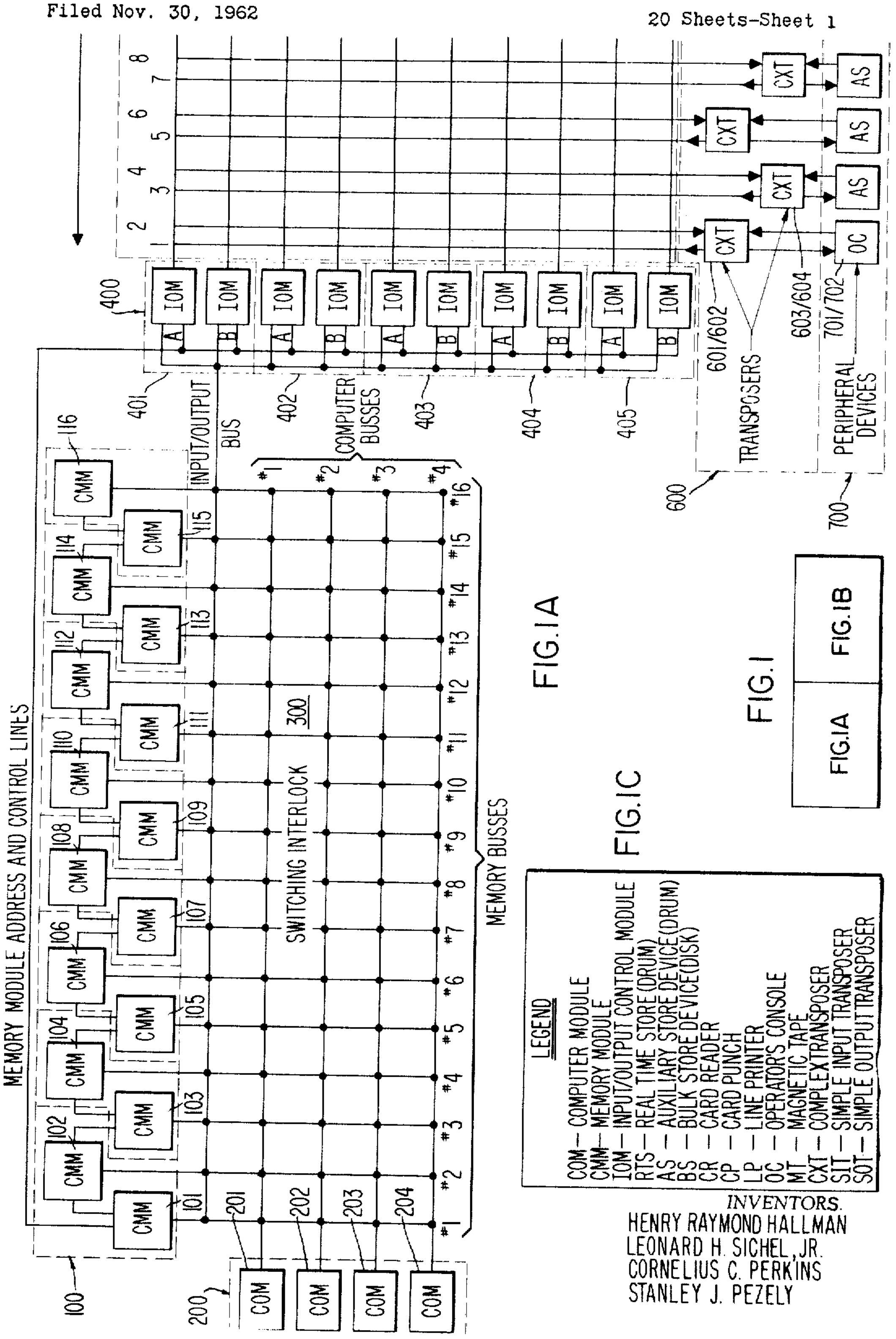
Figures 5, 5A:
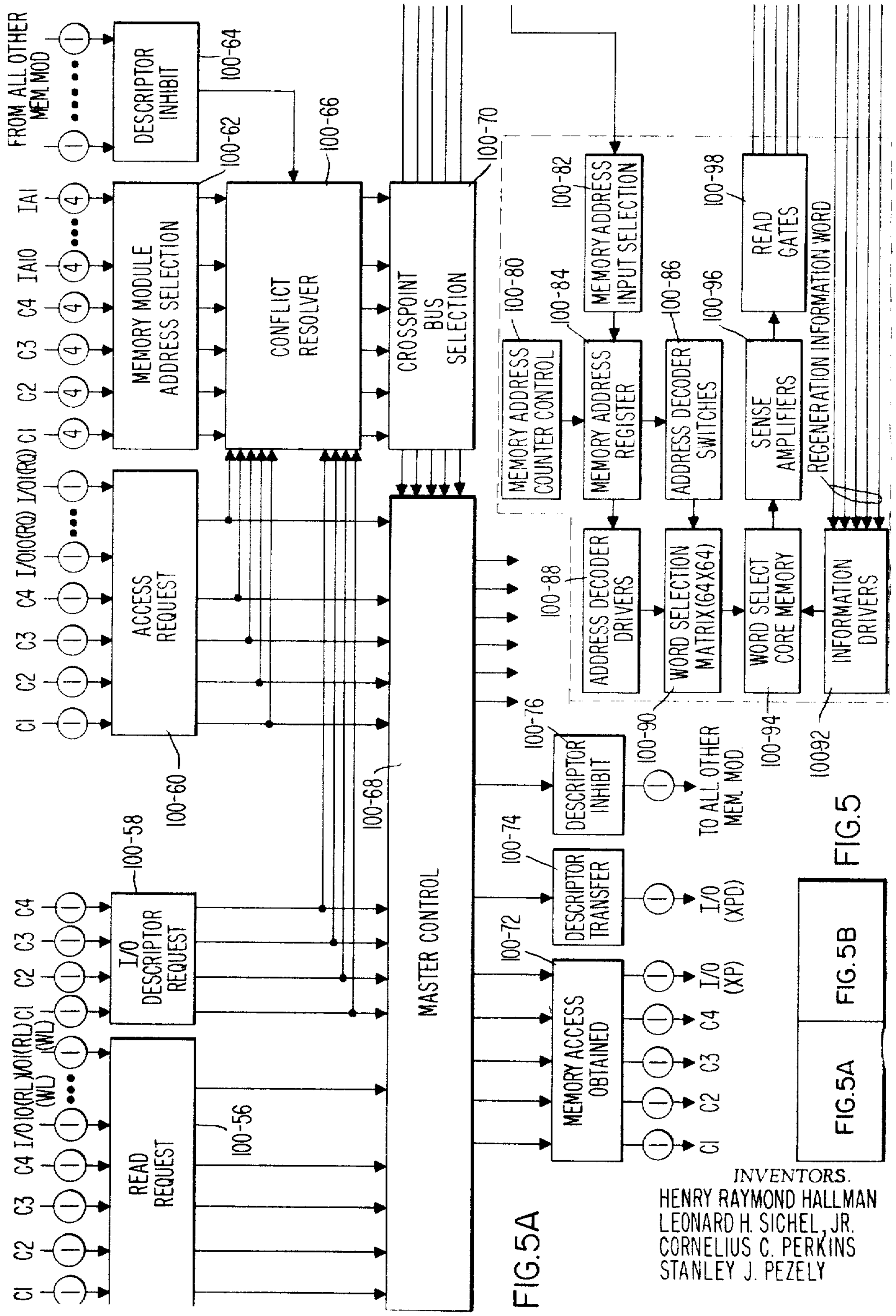
Figure 5B:
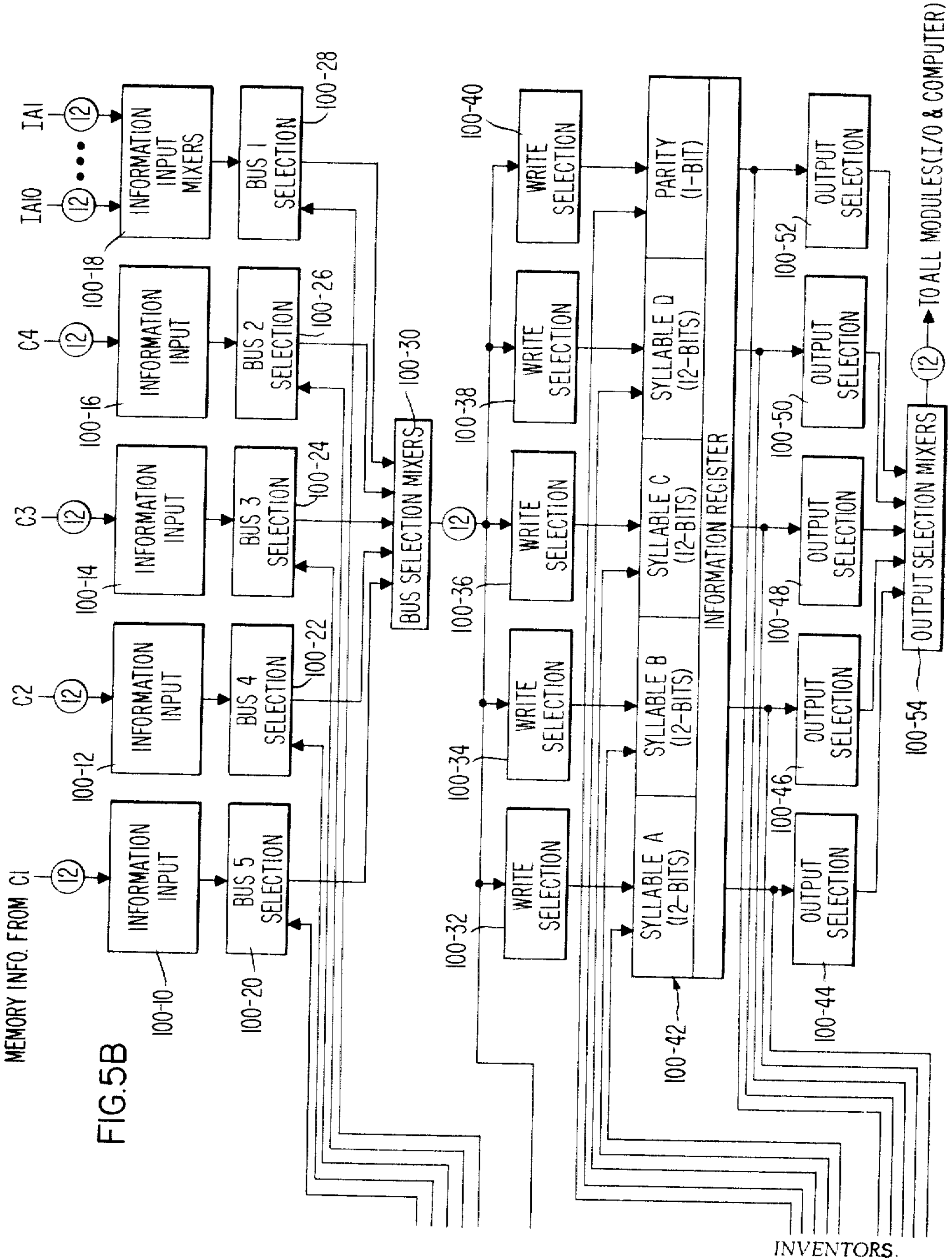
Figure 6:
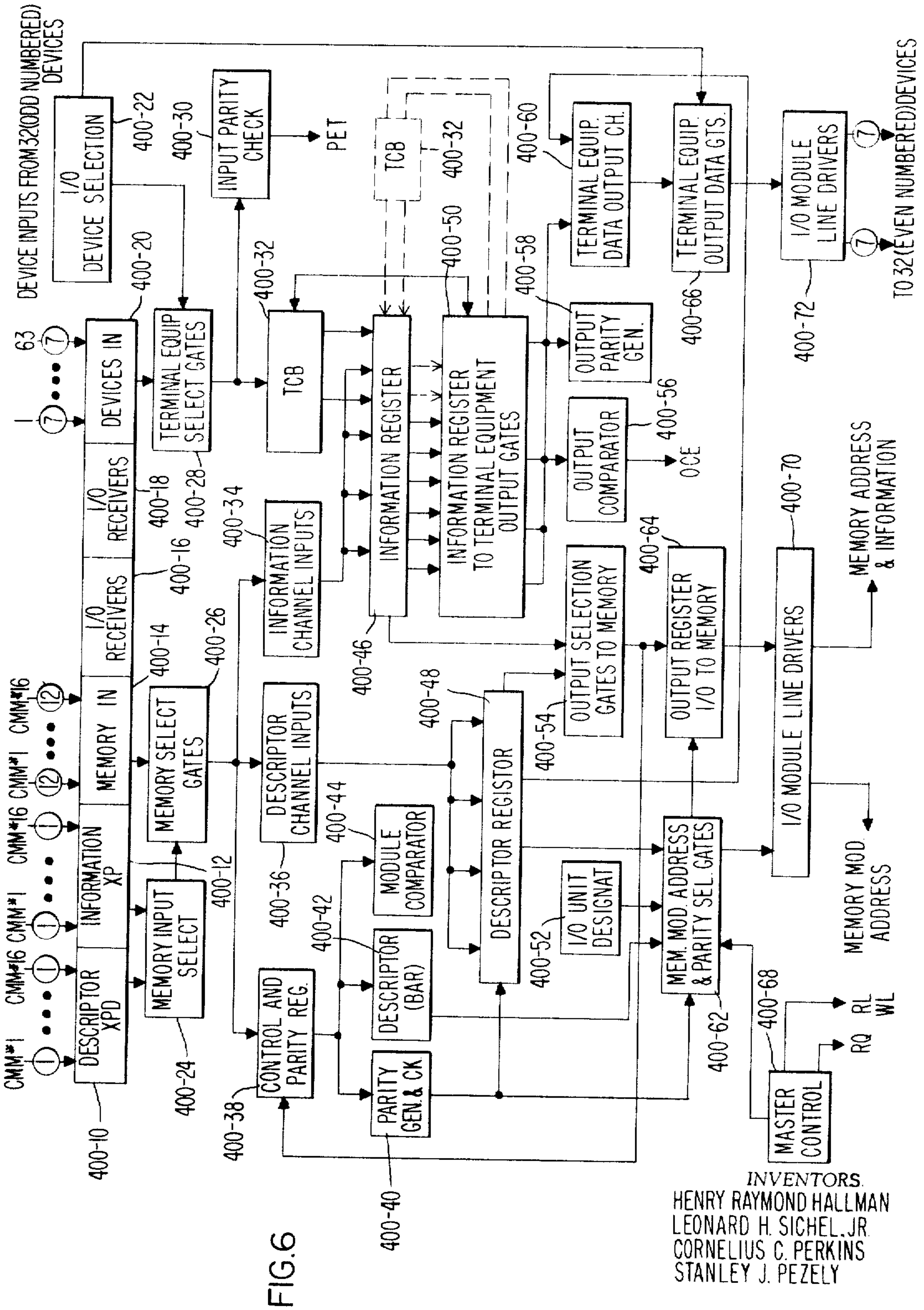
Figure 7:
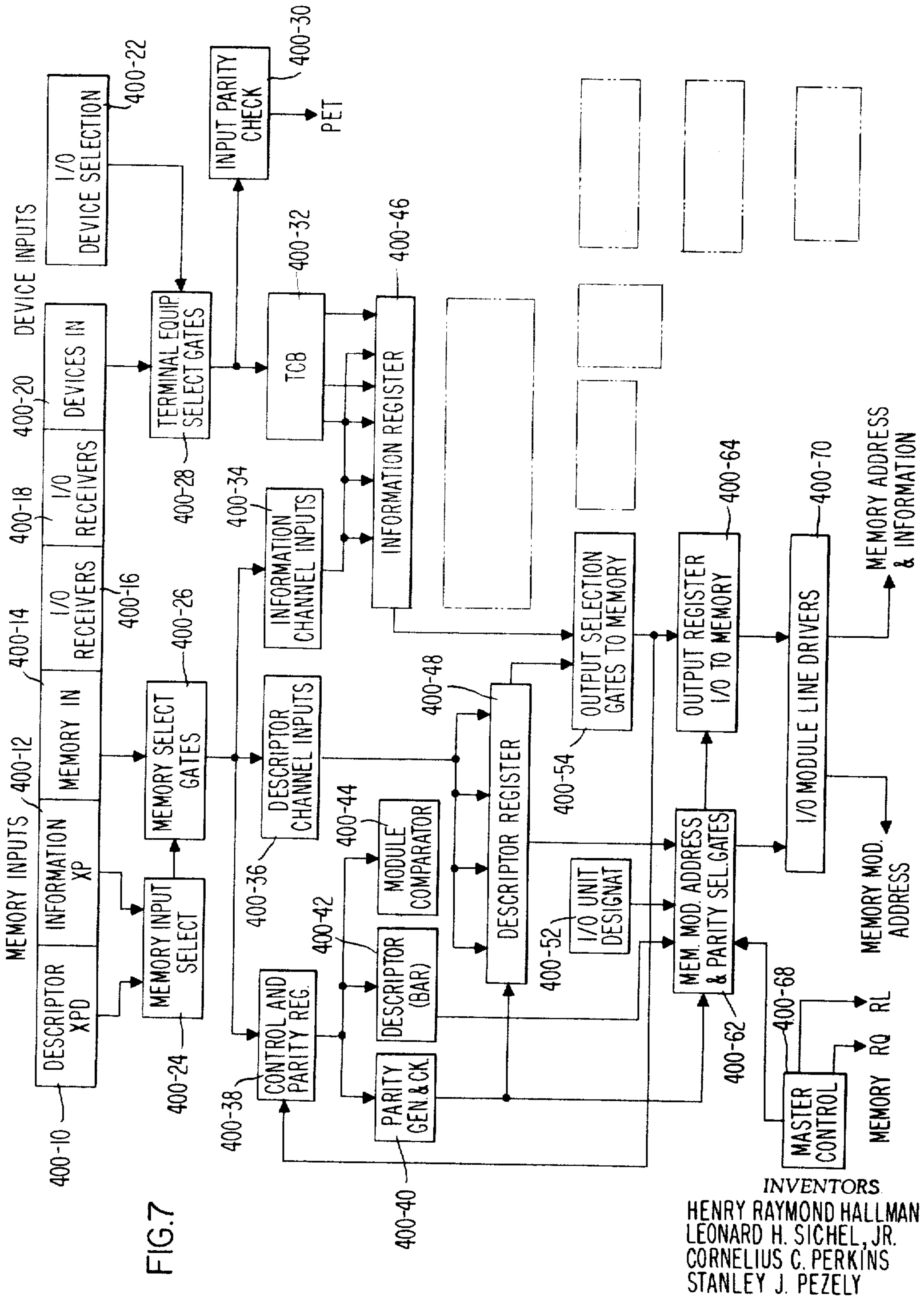
Figure 8:
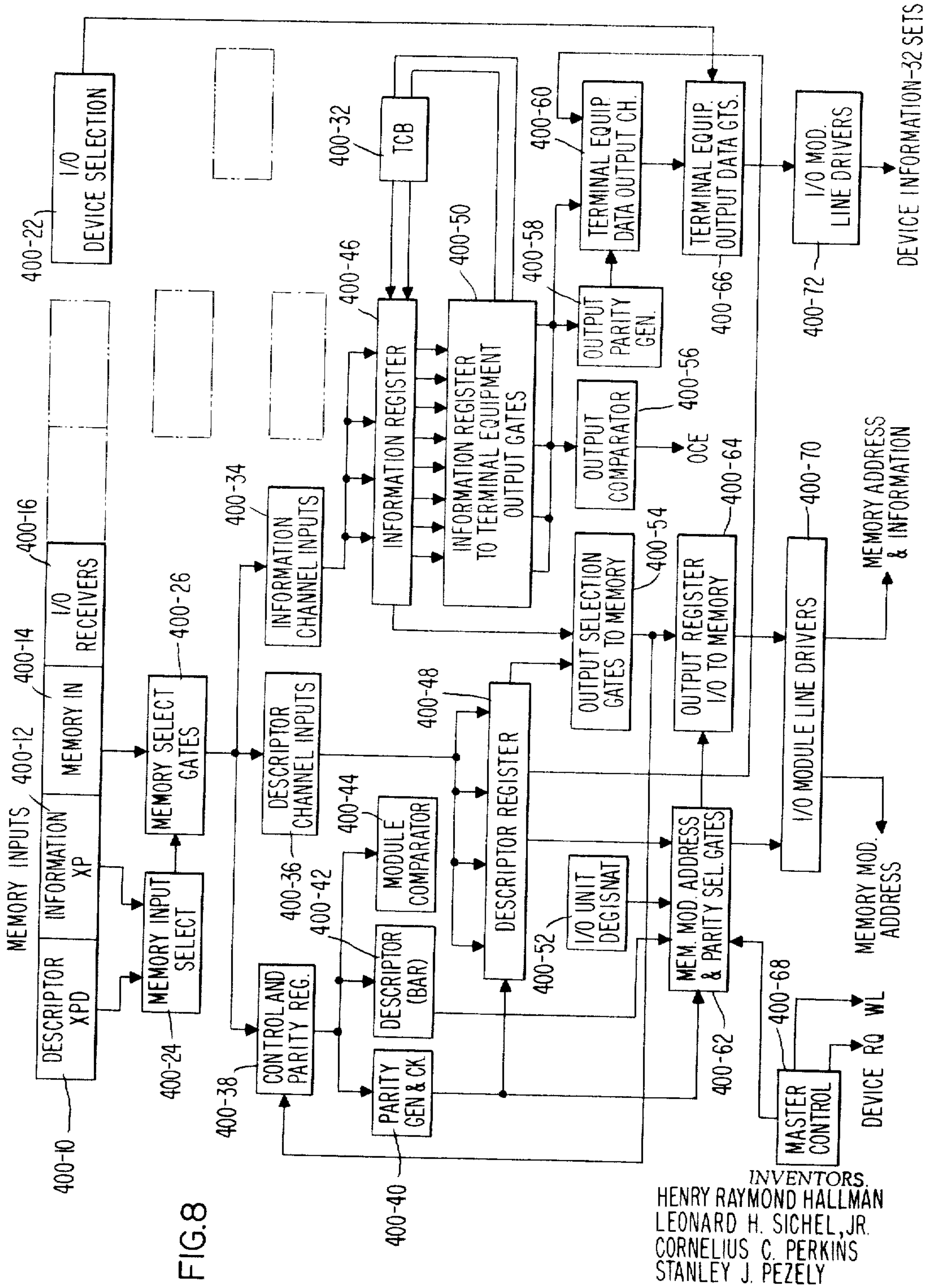
Figure 9:
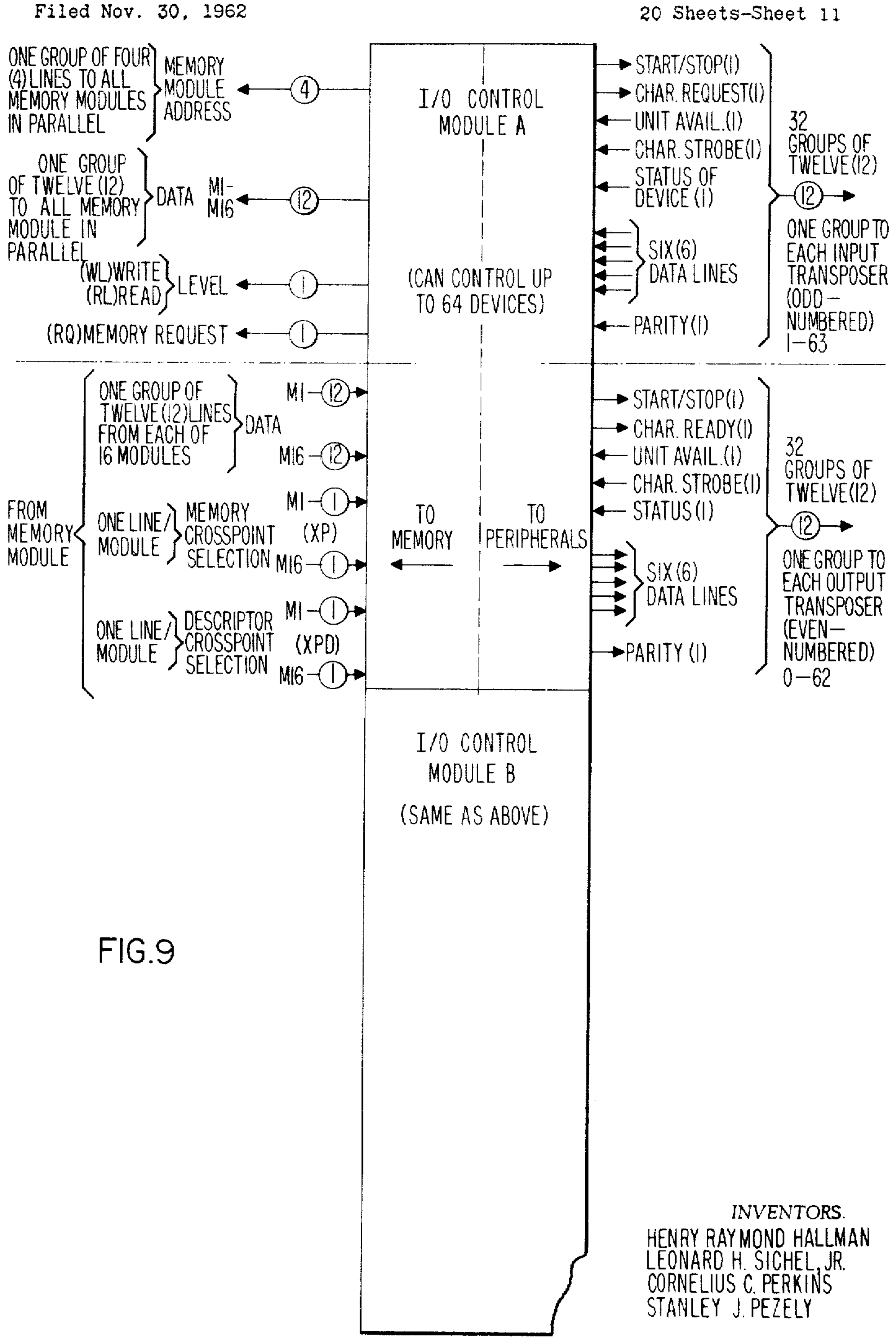
Figure 11:
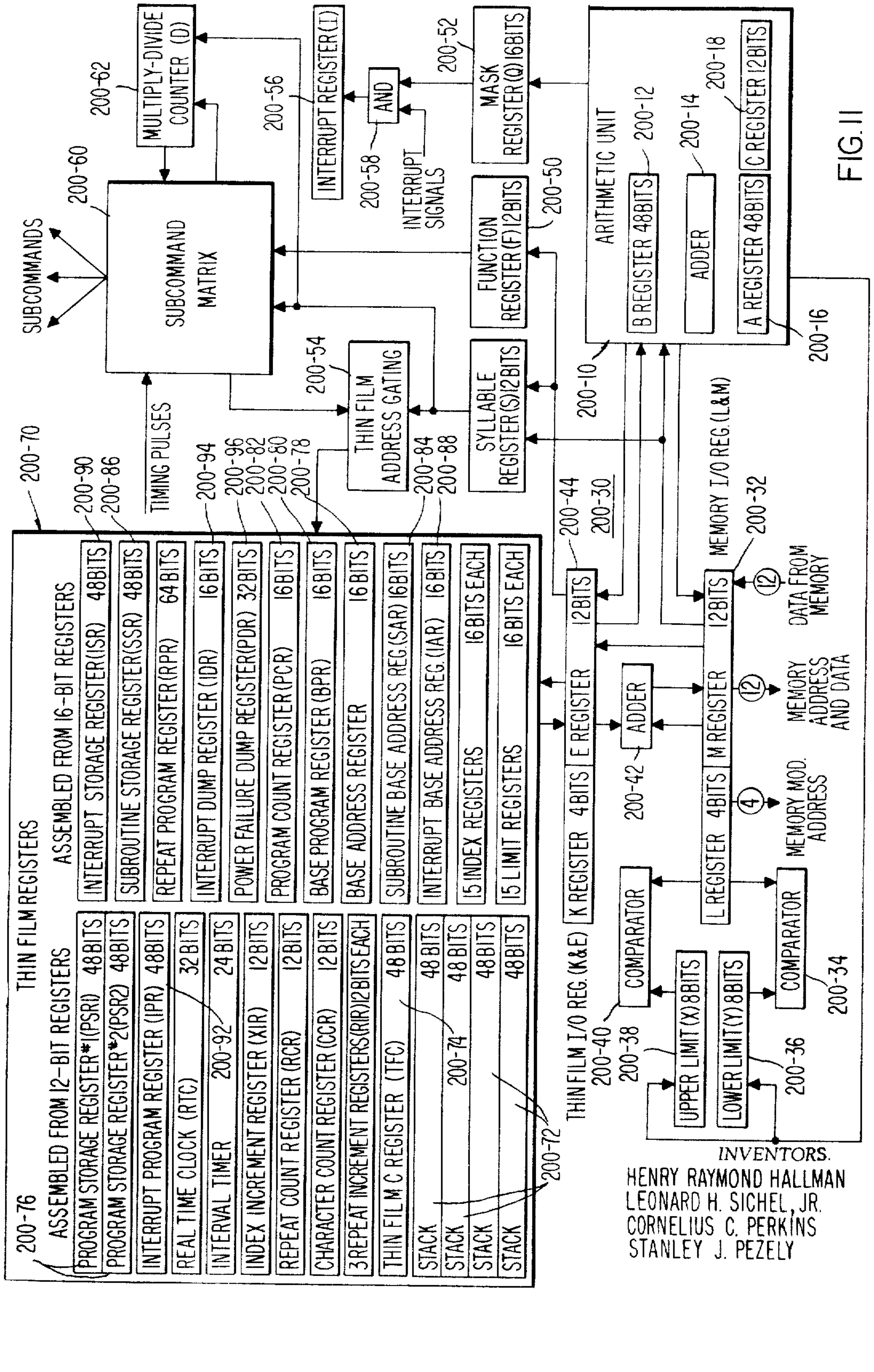
Figure 13:
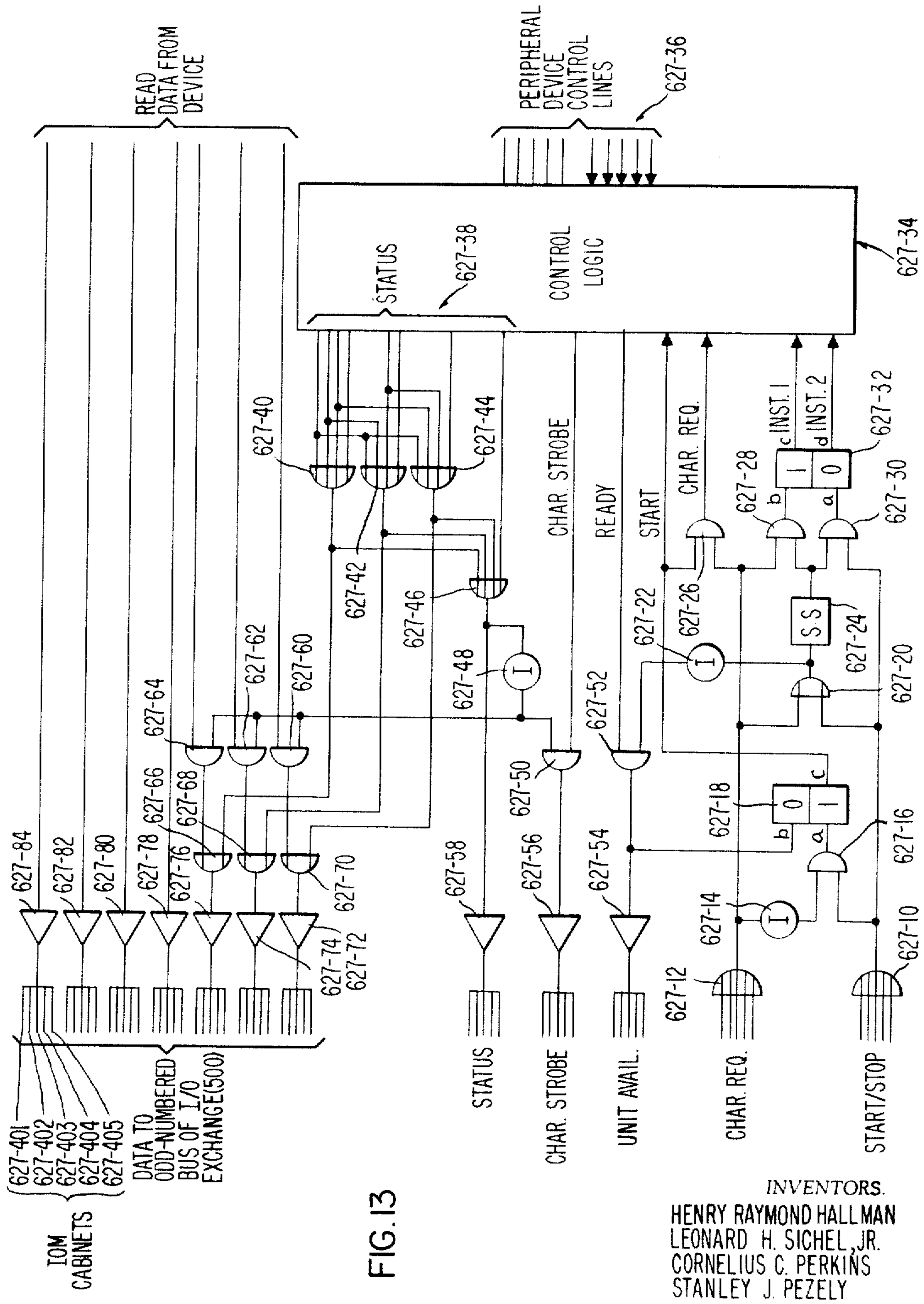
Figure 14:
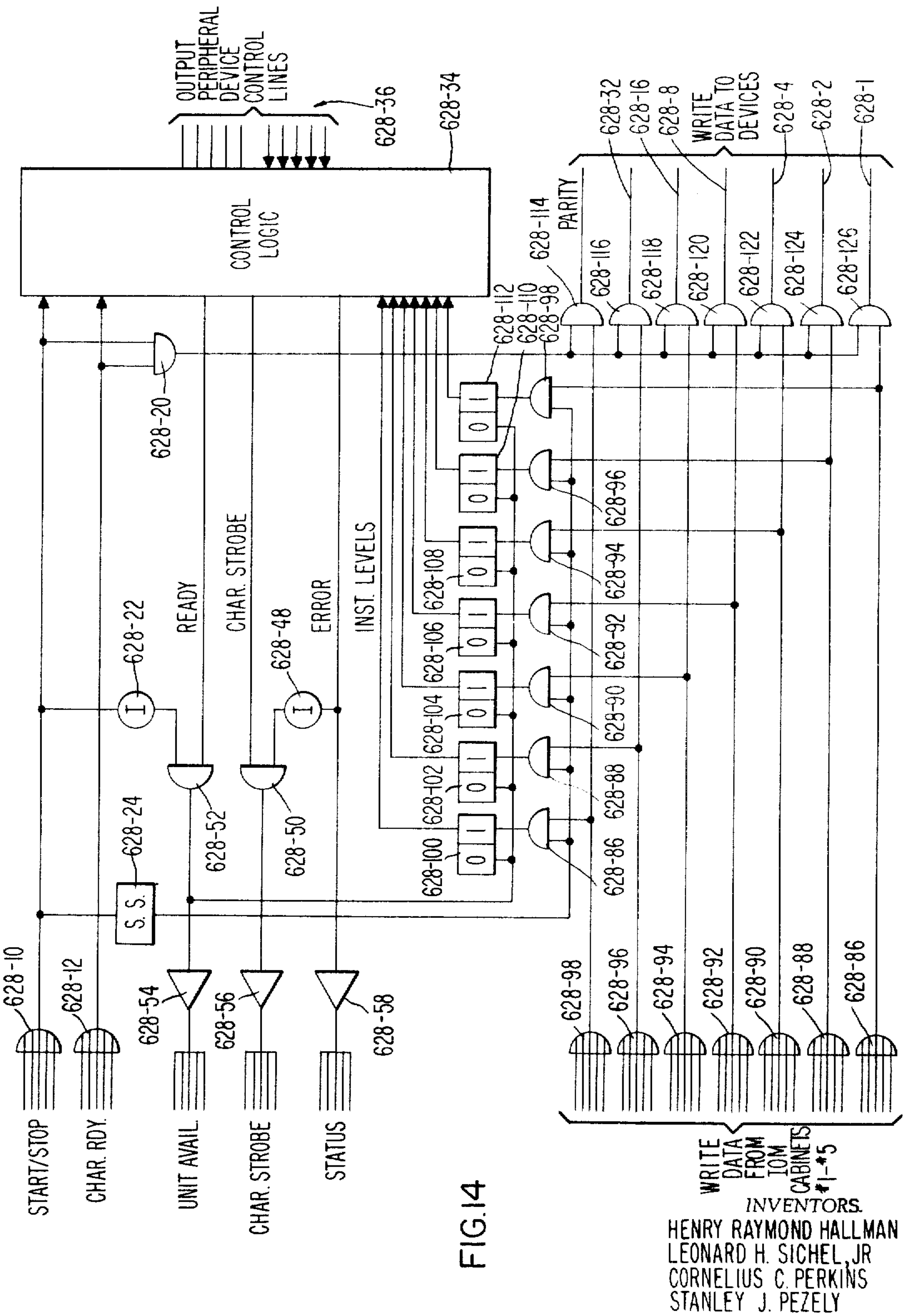
Figure 15:
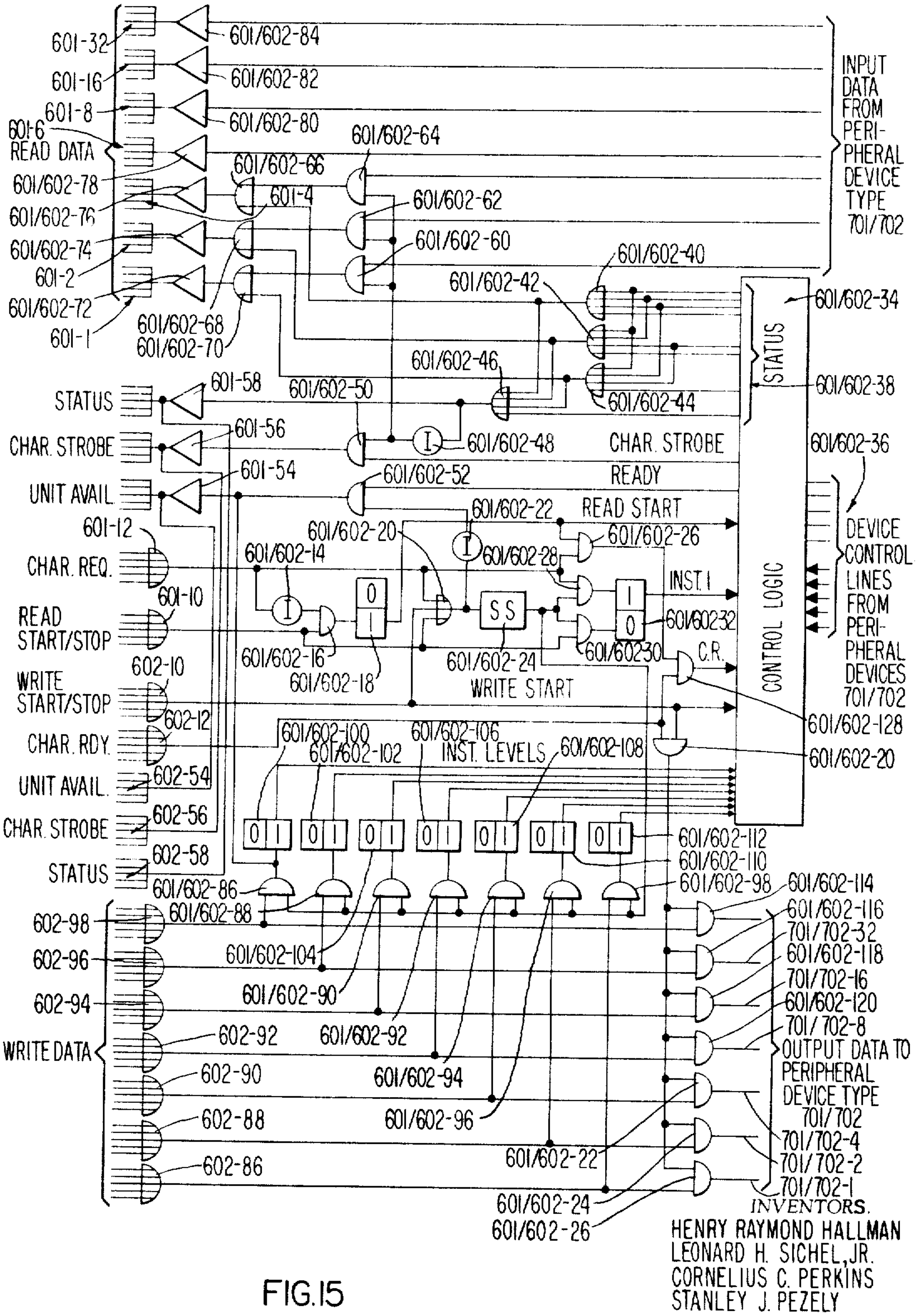
Figure 16:
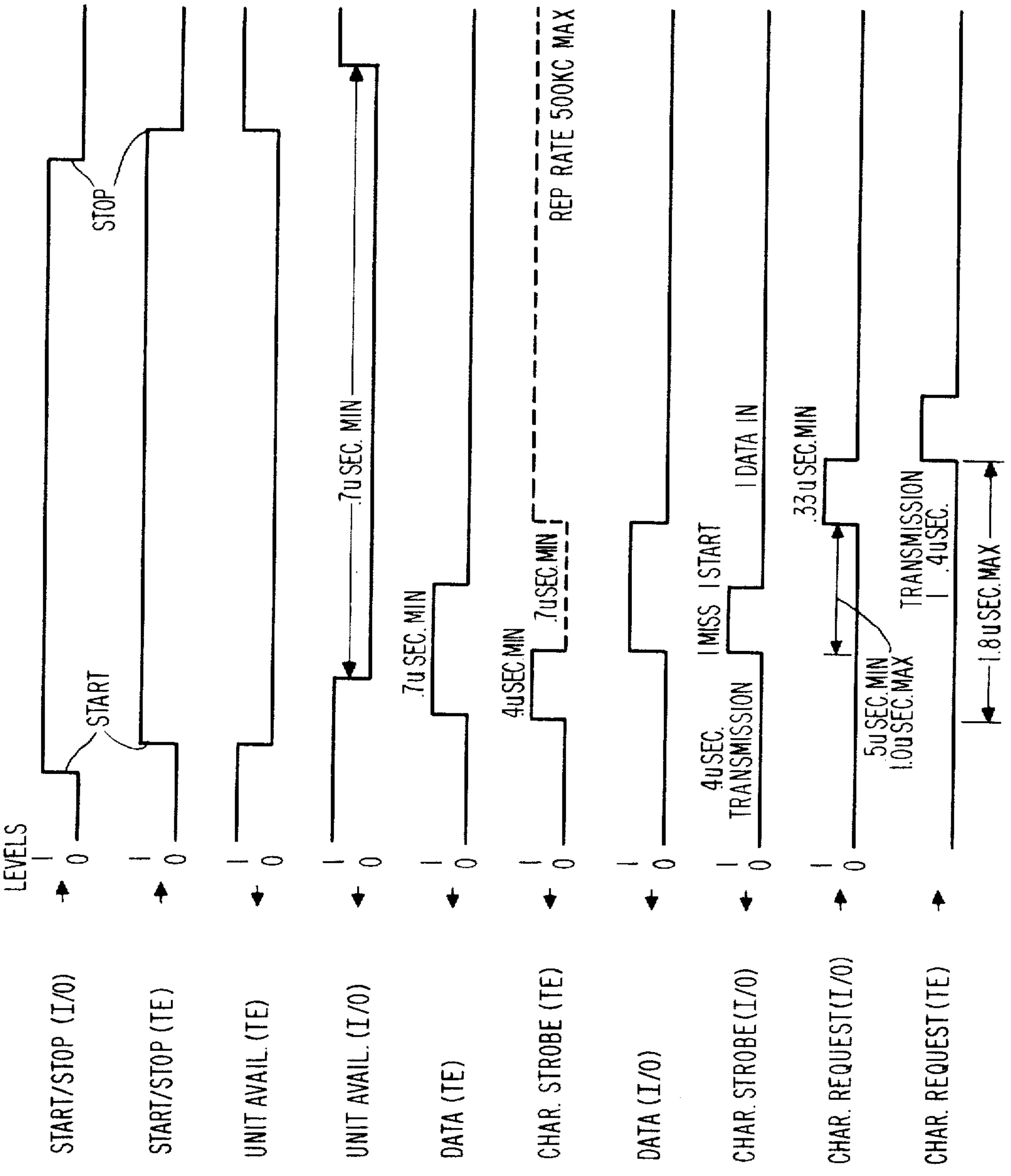
Figure 17:
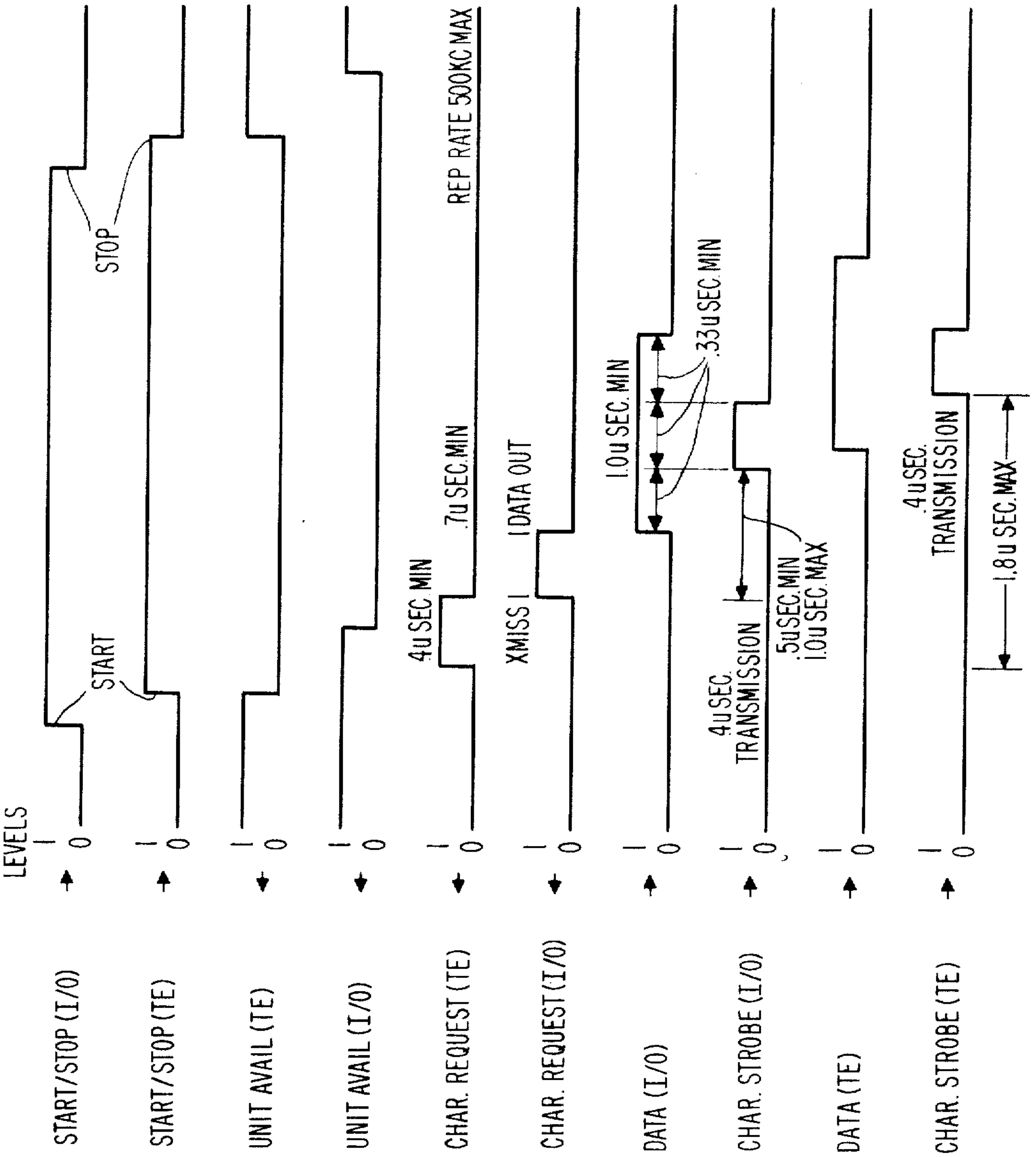
Figure 18:
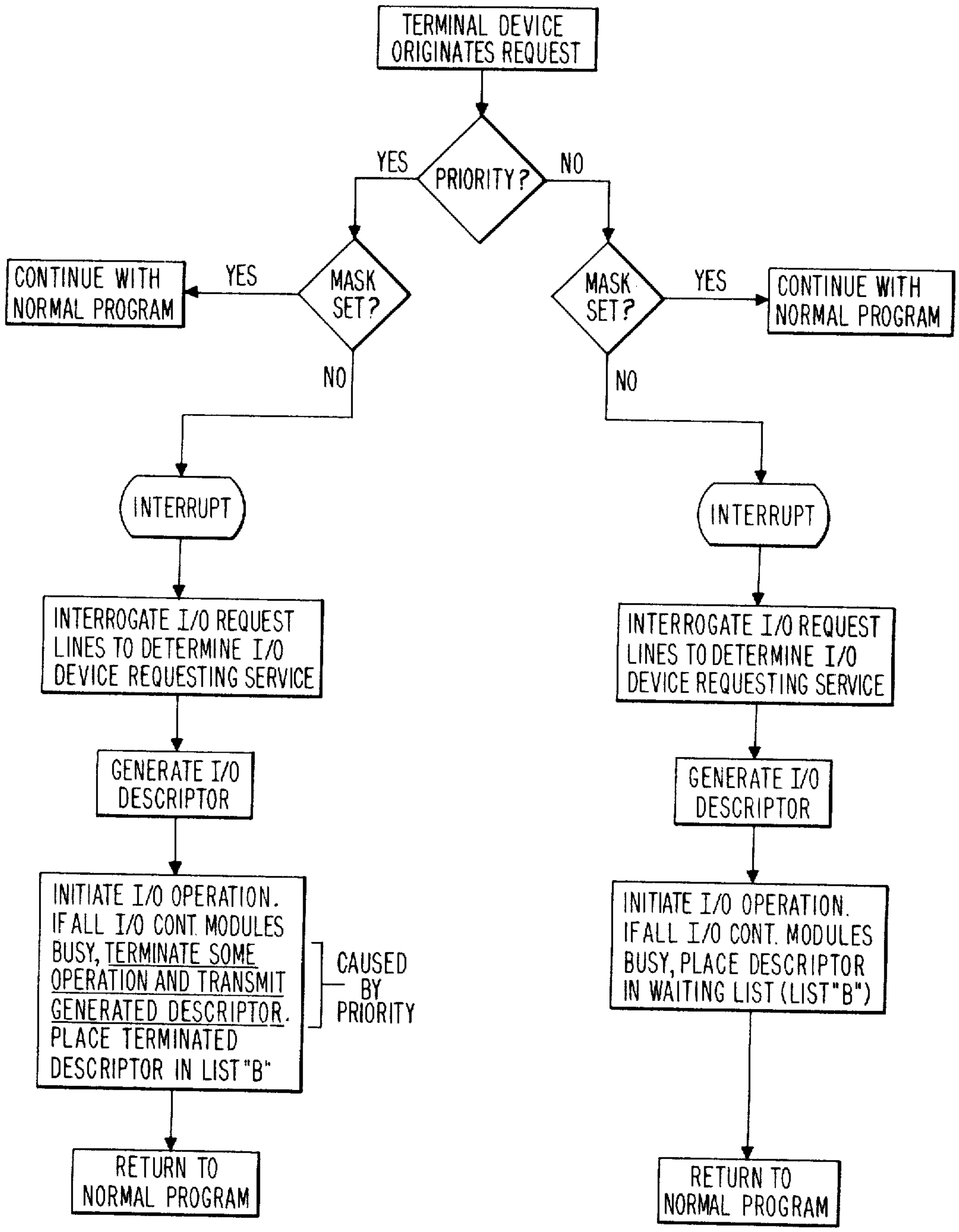

FIG. 5 includes FIGURES 5A and 5B and taken together is a block diagram of the memory module used in the system as shown in FIG. 1;

FIG. 6 is a block diagram of the entire input-output control module as used in the system as illustrated by FIG. 1;

FIG. 7 is a block diagram of the input-output control unit indicating those blocks used on input operation, FIG. 8 is a block diagram of the input-output control unit on output operation;

FIG. 9 is a connection diagram of input-output control module of FIG. 6;

FIG. 10 is an enlarged view of the memory area containing two lists "A" and "C" of *I/O* Module Descriptors;

FIG. 11 is a block diagram of one of the four (4) computer modules shown in FIG. 1 as reference 200;

FIG. 12 is a table of command descriptor types and their modifications within a descriptor word;

FIG. 13 is a logical diagram of a Simple Input Transposer peripheral indicated in FIG. 1;

FIG. 14 is a logical diagram of a Simple Output Transposer indicated in FIG. 1;

FIG. 15 is a logical diagram of a Complex Transposer;

FIG. 16 is the timing diagram of a Simple Input Transposer;

FIG. 17 is the timing diagram of a Simple Output Transposer;

FIG. 18 is the logical flow-path of a peripheral device request for service.

INDEX

General Description
Descriptors
(A) Set-up Descriptor
(B) Release Descriptor
(C) Command Descriptor
(1) Simple Output Write Command
(2) Complex Write Command
(3) Simple Input Read Command
(4) Complex Read Command
(D) In Process Descriptor
(E) Result Descriptor
(F) Descriptor Status Information (*I/O* Modules)
(1) In Process Descriptor Status Information
(2) Result Descriptor Status Information
(G) Descriptor Status Information (Peripheral Devices)
(H) Descriptor Status Modification by Peripheral Device
(1) Terminate Peripheral Operation
(2) Conditionally Terminate Peripheral Operation
(3) End of Word to Peripheral
(4) Cancel Current Word to Peripheral
(5) Count back the Memory Address
Memory Module
(A) Write Operation
(B) Read Operation
Computer Module
(A) Interrupt
(B) Send Set Up Descriptor
Input-output Control Module
(A) Descriptor Flow-path
(B) Input Information Flow-path
(C) Output Information Flow-path
(D) System Operation of Input-Output Module
(E) Input-Output Control Module Selection
(1) Load Set-up Descriptor
(a) Non Busy Input-Output Modules
(b) Busy Input-Output Modules
Transposers
(A) Simple Input
(B) Simple Output
(C) Complex
Peripheral Devices
(A) Control of System by Peripheral Devices.

GENERAL DESCRIPTION

Figure 1B:
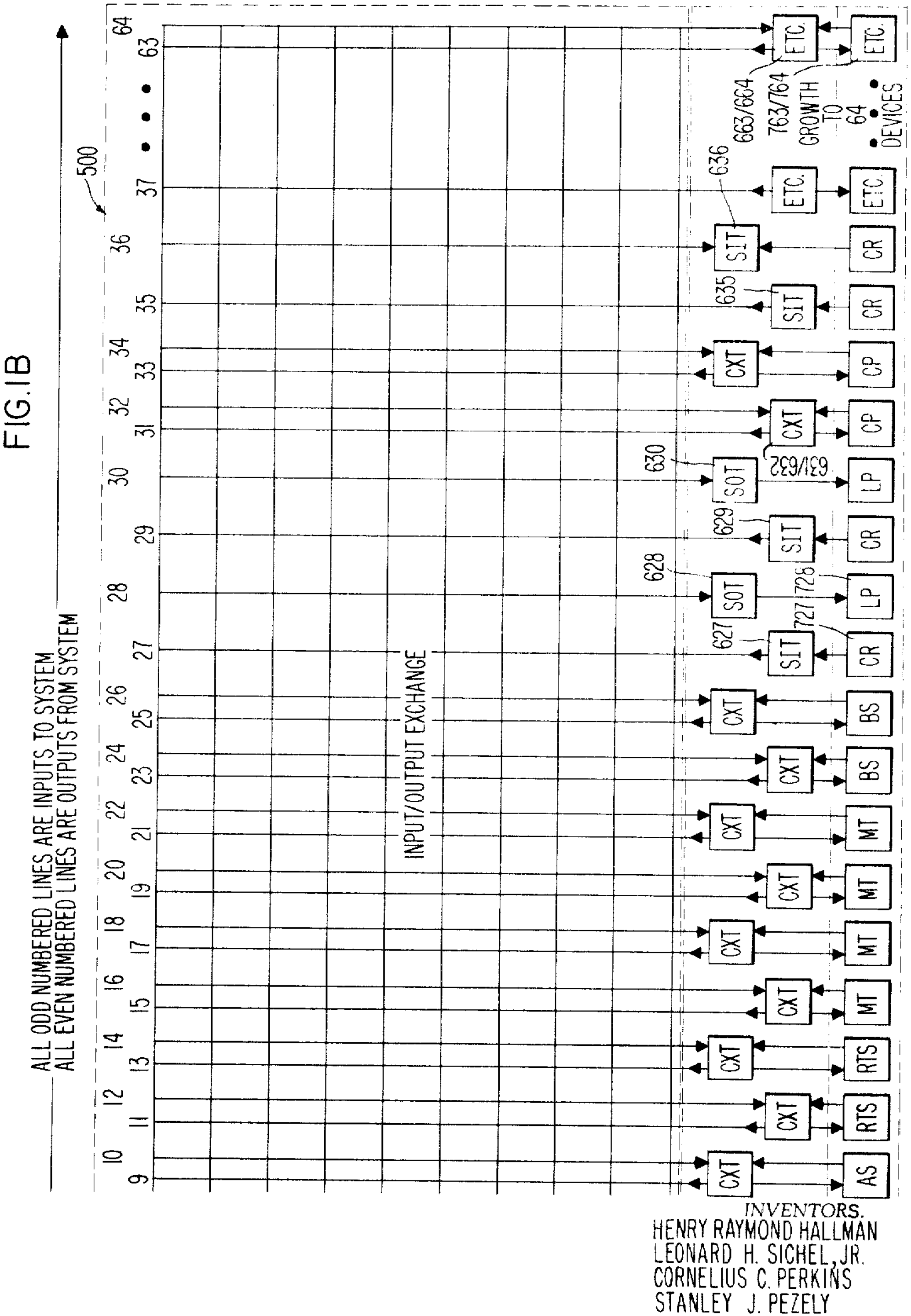

The data processing system, as shown in FIGURES 1A and 1B joined together and described in the legend table 1C, is operated in two modes, normal and control, under the execution of two programs. The normal mode is the period when the processor is performing its primary function of data manipulation. A shift from this normal mode to the second or control mode occurs when an input/output operation becomes necessary. The present invention will refer almost entirely to the control mode of operation of the system. This is necessary, since, as has been noted, it is during this mode of operation that the input/output functions are initiated and controlled. While the detailed description will refer to the input/output control module as well as to the peripheral devices and their associated components, it will be necessary at least briefly, to describe other portions of the computer system in order that sufficient information be given for a proper understanding of the present concept.

We will now discuss generally the entire data processing system by reference to the general block diagram shown in FIGURES 1A and 1B taken together and defined in the table of legend 1C. This should give sufficient background information for the more detailed discussion of the input/output control system during the control mode of operation which follows.

A group 100 of sixteen memory modules 101 through 116 comprises the main memory of the data processing system. Each memory module is a linear select (word organized) random access magnetic core memory. Each module contains 4096 words of 48 bits each, plus parity, and the fully expanded system of sixteen modules therefore provides 65,536 words of memory.

All sixteen modules 101 through 116 are fully shared by a group 200 of four computer modules 201 through 204. The fully shared memory feature is accomplished by a switching interlock 300 (discussed in detail in copending application Serial No. 89,525, by Hopper et al., entitled "Computer System," filed February 15, 1961, and assigned to a common assignee, which is created by cross connecting all sixteen memory busses with all four computer busses. A fifth bus connecting to each of the sixteen memory modules 101 through 116 is the Input/Output bus. This single bus is fully shared by a group 400 of ten Input/Output Control Modules, 401 through 410. These ten input/output control modules 401 through 410 illustrate the maximum number of input/output control modules in this described embodiment. Each of the input/output control modules 401–410 essentially comprises a number of control and data manipulation registers together with their associated decoding and timing circuits. Each control module is capable of controlling any peripheral device of the input/output complement and there can be as many simultaneous input/output operations as there are input/output control modules. A second group of cross point connections creates the input/output matrix or exchange 500. These are indicated in FIG. 1 as the input/output exchange. It is a matrix created by cross connecting the fixed output of each of the ten input/output control modules 401 through 410 to the fixed input of a plurality of transposing devices or transposers 600. Connected to the output of these transposers 600 is a plurality of peripheral or terminating devices 700. A maximum number of peripheral devices for the present embodiment, as shown in FIG. 1, is sixty-four units. Each of the peripheral units is referenced by a particular group of letters. These letters are explained by the legend block indicated below the system as FIGURE 1C. The transposers are used to harmoneously couple the fixed interface of the input/output exchange to the variable interfaces of the peripheral devices.

Each transposer will be referred to by indicating the operational direction of the particular peripheral device.

The input/output exchange 500 provides up to sixty-four single directional peripheral data and control cables 1 through 64 to service the peripheral devices 700. The thirty-two odd numbered cables 1, 3, 5 . . . 63 are called input cables. The remaining thirty-two even numbered cables 2, 4, 6 . . . 64 are called output cables. A peripheral device which uses only one such cable is called a simple device. Such single direction peripheral devices, therefore, may be either simple input or simple output device, depending on their operational direction. A bi-directional peripheral device utilizing both an input and output cable is referred to as a complex device.

Transposers used with each such peripheral device have a corresponding title. Single direction devices being either a simple input or a simple output transposer and bi-directional units complex transposers. The present invention, through the use of a plurality of memory accesses by a corresponding plurality of Input/Output Control Modules, allows simultaneous operation of a plurality of peripheral devices.

This has been accomplished by utilizing a small percentage of central processor time to merely initiate an input/output peripheral operation. This has been further accomplished through the use of a plurality of identical memory modules, a number of Input/Output Control Modules having universal characteristics, a matrix for coupling each Input/Output Module to any of the peripheral devices, and a transposing unit to match the fixed interface of the Input/Output module to the variable interface of the Peripheral Devices. Thus, when two or more input/output control units are added to a data processing system of the type shown in FIG. 1, parallel communication may be accomplished between separate modules of the main memory and separate peripheral units. The data processor may also simultaneously communicate with a separate memory module, if necessary. This simultaneous activity allows for more efficient computer use during the execution of any program.

DESCRIPTORS

Much of the success of the present input/output system is based upon the manner in which the computer word commands are created and handled. Such word commands, when used herein, will be called descriptors. A descriptor is a computer word used specifically to define characteristics of a program element. For example, descriptors are used for describing a data record, a segment of a program, or an input/output operation. Since immediate concern in the present invention is with the input/output area of the data processor, the discussion will be confined to those descriptor types which are specifically concerned with the input/output system of the data processor.

The present embodiment contains five types of input/output descriptors. They are called (1) Setup Descriptor, FIG. 4B (2) Command Descriptor, FIG. 4C, (3) In Process Descriptor, FIG. 4D, (4) Result Descriptor, FIG. 4E, and (5) Release Descriptor, FIG. 4F. As seen by reference to FIG. 2, the Setup Descriptor, the Command Descriptor, and the Release Descriptor are generated by the memory 101 as the result of a signal to do so by the computer 201, while the In Process Descriptor and the Result Descriptor are responses from the Input/Output Control Module 401. Computer module 201, upon being interrupted during its processing, shifts from its normal processing mode to a second or control mode. It then signals the memory module 101 containing the program required Setup Descriptor to transmit that Setup Descriptor to all Input/Output Control Modules 401. Each *I/O* control module loads its base address register with this Setup Descriptor. Next the Computer Module 201 signals the memory module to issue a required Command Descriptor. Upon receipt of this Command Descriptor, the lowest sequentially numbered non-busy *I/O* module 401 issues to a memory module an In Process Descriptor Upon conclusion of the input/output operation, a Result Descriptor is returned to a memory module by the *I/O* Control Module. When the computer module has had time to review the Result Descriptor, it issues a Release Descriptor to the Input/Output Control Module. It should be noted herein that the particular Input/Output Control Module returning a Result Descriptor will not be released until the Release Descriptor has been issued by the Computer Module. This is true even though the peripheral device associated with the completion is disconnected from the *I/O* Module as soon as the Result Descriptor is sent.

The general format of a descriptor may be as shown in FIG. 4A. It should be noted that the entire descriptor is equal in length to a full word of the data processor system. That is, there are 48 bits in the overall descriptor length. The initial 12 bits 1–12 of FIG. 4 will indicate the number of words to be transferred during the present operation (word count). The next four bits 13 to 16 include the block count field. The block field may be used to count records in magnetic tape operation and to furnish vertical format information on drum printer operations. That is, any transfer involving parts or segments of memory other than words. These segments or portions are referred to as blocks of memory. The next four bits 17 to 20 entitled "Status," together with the two bits further to the right, 37, 38, entitled "Device Status," indicate the status of the peripheral device and the Input/Output Control Module. The three bits 20, 37 and 38 are controlled by the peripheral device, the remaining three, 17, 18 and 19 by the Input/Output Control Module. In each case status information is encoded. The next four bits 21, 22, 23 and 24, labeled Memory Module Address, indicate the memory module destination. The next twelve bits 25 to 36 are the address of the memory line within the selected memory module. The twelve binary bit capacity will allow a total of 4096 combinations. Since this is the total number of lines within any one memory module, this twelve bit address is capable of addressing any single line. The six bits 39 to 44 indicated as Device Number (note shift of #44 to Order Code below) indicate the particular peripheral device which is to receive the information transferred. The remaining four bits 45 to 48 labeled Order Code, are used together with bit 44 from Device Number to give a total of five bits for the overall Order Code. These five bits can give a total of thirty-two binary instructions ($2^5=32$). Four of these thirty-two possible instructions are not used for reasons of design simplicity. The remaining twenty-eight are divided into six basic instructions for operation of the Input Output Control Module. The following list indicates the number of Order Codes in each of the six basic instruction types:

(1) Terminate present operating device—two codes, one used
(2) Load Descriptor Base Address Register—one code
(3) Simple Input Read Device—two codes
(4) Simple Output Write Device—seven codes
(5) A Complex Read Device—eight codes
(6) A Complex Write Device—eight codes Since each descriptor requires one memory word consisting of various keys to locate data or to specify input/output operations, indexing procedure will permit all programs for the data processing system to be completely independent of actual storage addresses and hardware configuration; provided, of course, that the minimum system is operative. This facility to relocate the program easily and automatically means that it can be segmented by a compiler into efficient working lengths and the interruption of processing does not result in loss of time or effort. Processing resumes automatically from the point of information interruption, even if the program has been removed from memory and loaded into a new area in the meantime.

At the time of completion, descriptors contain identification links and information concerning the size and location of data record to be identified. Every time the program reference material is loaded into the core memory, the master control program supplied new core memory base addresses for each group of data referenced in the table. Because the actual location of this information is determined and recorded each time the program is loaded, all programs and associated data, working areas, and input/output operations can be relocated automatically according to current processing conditions. The programmer need never be concerned with assignment of memory locations or input/output units.

(A) *Setup descriptor.*—A Setup Descriptor, as shown in FIG. 4B, is transmitted simultaneously to all Input/Output Control Modules from a Memory Module by a Computer Module which is in the control mode. Usually, the issuance of a Setup Descriptor results from an unconditional transfer of an input/output instruction. The Input/Output Control Module, which has been inactive (non-busy) and has the lowest sequential number is given the highest priority. This Input/Output Control Module responds to the Setup Descriptor and a Command Descriptor, FIG. 4C, is sent from the Memory. The operational state of an Input/Output Control Module is indicated by the status bits 17, 18 and 19 of FIG. 4D. Upon receipt of the Command Descriptor, the selected Input/Output Control Module will engage the required peripheral device and return an In Process Descriptor, FIG. 4D, to a memory module.

The location in the memory to which the In Process Descriptor of FIG. 4D will be returned will be dependent upon the Descriptor Base Address Register. The In Process Descriptor will be returned to the location indicated by the eleven bits of the Descriptor Base Address of the Setup Descriptor, FIG. 4B. During the period immediately following power application, but prior to receipt of the first Setup Descriptor, the Descriptor Base Address Register will contain zeros in these bit locations.

All ten Input/Output Control Modules check the Setup Descriptor for correct parity. These modules that are idle but not next in line of priority will load their Descriptor Registers 400–48 of FIG. 6, with the last twelve bits 37 to 48 of the Setup Descriptor.

Once an Input/Output Control Module has accepted a Command Descriptor, it will give a busy status and will remain busy until it is released by a Release Descriptor issuing from some Computer Module 200.

If the parity is not correct as determined by each individual Input/Output Control Module, the contents of the Descriptor Base Address Register will not be changed. The lowest sequentially numbered non-busy Input/Output Control Module which detects the parity error will return an In Process Descriptor with a parity error status contained therein.

If the parity is correct and a Setup Descriptor is correctly received, a non-busy Input/Output Control Module will set to one the bit 19, in the status field of the Setup Descriptor before returning an In Process Descriptor. This information will appear in the Descriptor Base Address Field of the new In Process Descriptor.

(B) *Release Descriptor.*—The format of the Release Descriptor is indicated in FIG. 4F. The Release Descriptor is transmitted by a computer module 200 to all Input/Output Control Modules. However, the only reacting one is as designated by the binary number in bits 39, 40, 41, and 42 of its format. This descriptor is usually sent as a result of an unconditional transmit input/output instruction (hereinafter referred to as TIO), by a computer module 200.

A Release Descriptor is used either to interrupt an input/output operation still in process, or if the input/output operation has ended, to release the Input/Output Control Module for a new assignment.

A Release Descriptor is ignored by all non-busy control modules. Further, it is ignored by all Input/Output Control Modules whose number does not match the control module number indicated by bits 39–42 of its format. If the designated Input/Output Control Module is in the busy condition it will accept and comply with the Release Descriptor instruction. However, even though the designated Input/Output Control Module is busy, i.e., waiting for release, if it detects a parity error in the Release Descriptor, it will also ignore the Release Descriptor. Further, if the first non-busy Input/Output Control Module detects a parity error, it will also return an In Process Descriptor with parity error status information contained therein. This is to guarantee that the Input/Output Control Module will not be sent new instructions based on an erroneous release signal. No computer will ever be interrupted because of a Release Descriptor.

Normally a Release Descriptor is used to allow an Input/Output Control Module to accept a new Command Descriptor. However, because of the possibility of losing descriptor information, an Input/Output Control Module will continue to remain busy after a peripheral operation has ended. This continuation of a busy condition will allow the Computer Module the time needed to examine the Result Descriptor (see below), returned by the Input/Output Control Module. After the computer is satisfied with the Result Descriptor, it will send a Release Descriptor from the Memory to that Input/Output Control Module. The receipt of a Release Descriptor will enable the Control Module to accept a new Command Descriptor.

Figure 2:
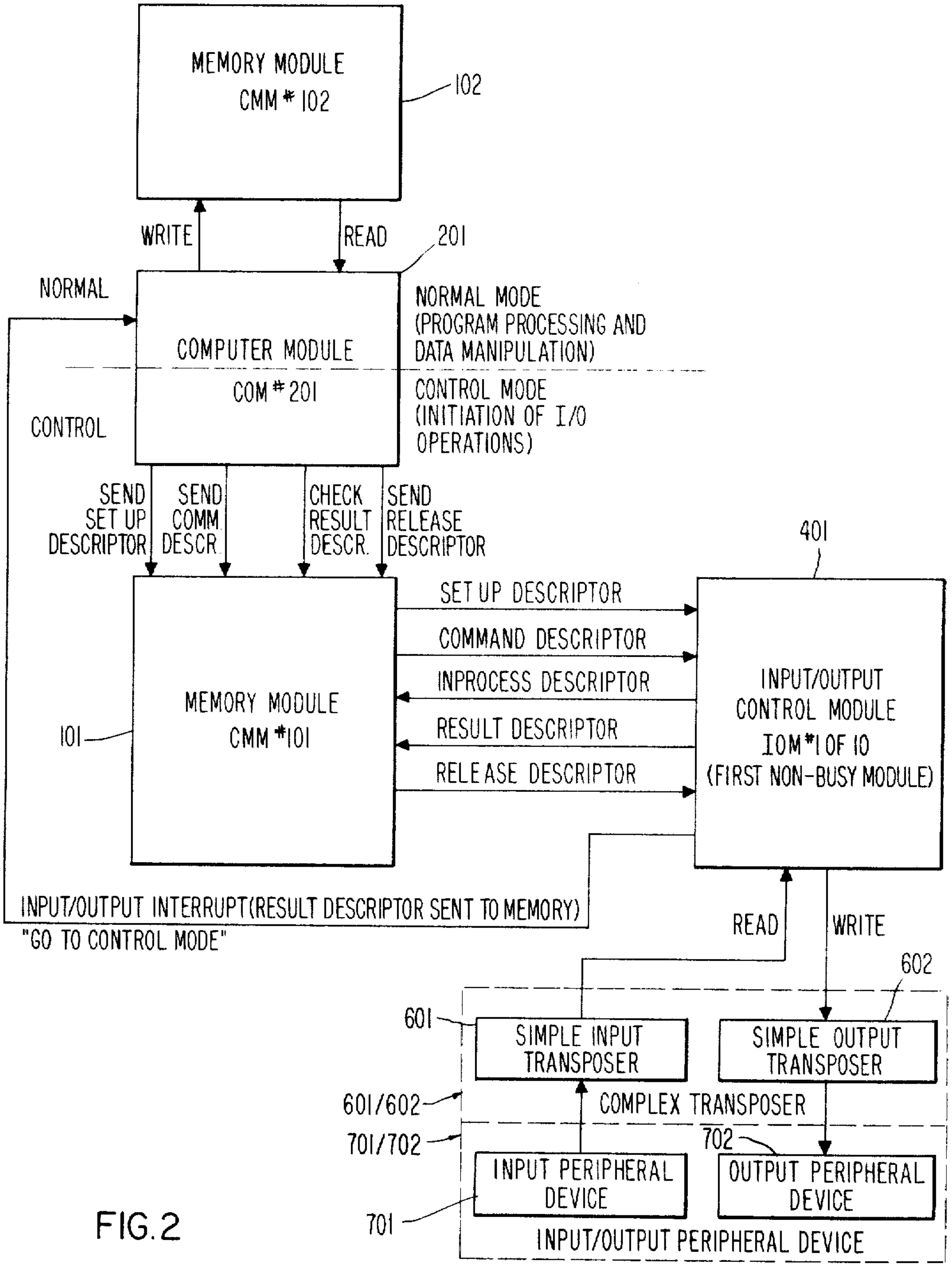
FIG. 2 is a block diagram showing the descriptor flow path of the inventive input-output control system wherein the data processing system is shifted to a control mode.

(C) *Command Descriptors.*—All transfers of data or initiation of any activity by a peripheral device is controlled by a Command Descriptor as shown in FIG. 4C. Such a descriptor is normally transmitted by a computer module executing the unconditional transmit Input/Output Instruction (TIO) as shown in FIG. 2. If all Input/Output Control Modules are busy, the Computer Module transfers control to the address specified by the third syllable in the TIO instruction.

There are four types of Command Descriptors specified by bits 44 and 45 of the descriptor word. These are shown in FIG. 12. They specify the type of peripheral device to be used and the function of that device. The four types are:

00 Simple Output Write Device
01 Complex Write Device
10 Simple Input Read Device
11 Complex Read Device By reference to FIG. 12, it is seen that each of the four types above have eight permissible variations by virtue of the three modification bits 46, 47 and 48, which may be interpreted by the particular device involved.

These eight variations are reduced to one in the case of the Simple Input Read device. First, there are only two lines carrying control information toward simple input peripheral devices. This limits the variation allowable to four possibilities.

Since, as previously mentioned, two of these four possibilities are already used for Setup and Release Descriptors, there remains only two possibilities. Of these remaining two, one instruction 10011 is only used to initiate action in the device and does not involve a transfer of data. Therefore only one instruction 10010 is possible for data transfer in a simple input device.

Now consider the four types of Command Descriptors as indicated in FIG. 12.

(1) *The simple write device (00).*—Refer to FIG. 14 which illustrates the transposers for this device together with FIG. 4C, the Command Descriptor. There are eight operations for this type of device ranging from 00000 to 00111. As the In Process Descriptor, FIG. 4D, is being returned, the three instruction modification bits 46, 47, 48 of the Command Descriptor are transmitted to a peripheral device over data lines 8, 16 and 32, on FIG. 14.

The four bits 13, 14, 15, 16 of the record count field of the Command Descriptor are transmitted over the remaining four data lines 1, 2, 4, and Parity, of FIG. 14. The peripheral device can detect and use these signals to vary its operation. If only three instruction modification bits are considered, the peripheral device may execute eight operations, depending on the type of one way output device. The record count field of four additional bits could be used to increase this number to 128 operations, or to convey variations on the basic eight instructions, such as the vertical format channels in a high speed printer.

Insofar as the Input/Output Control Module is concerned, the Simple Write Device command has no variations, and is interpreted as follows:

Transmit the number of words specified by the word count field bits 1 to 12 of the Command Descriptor starting at the memory line address given by the twelve bits 25 to 36 of the memory module address specified by the four bits 21 to 24 of the Command Descriptor as shown in FIG. 4C. Next, continue transferring data until the member in the word count field is reduced to zero. But, terminate the operation early if the Status line 628–58 of the peripheral transposer in FIG. 14 becomes a one, or if any of several conditions detected by an Input/Output Control Module becomes apparent.

The Status signal 628–58 of FIG. 14 from a Simple Write Device operation is limited to one code in the peripheral status field of the returning Result Descriptor of FIG. 4E. There are not enough return lines in the direction of the Input/Output Control Module to allow a more detailed explanation for terminating this operation. The code used is 000–010, and will mean that something went wrong.

(2) *Complex write device (01).*—Initiating operation in the Complex Write Device of FIG. 15 is identical to that of a Simple Write Device. The transfer of data and the ending are different, however.

If bit 46 of the Command Descriptor in FIG. 4C, the most significant of the instruction modification field, is a one, the Character Strobe Signal 602–56 of FIG. 15 will become a one whenever the least significant eight bits 4 to 12 of the Command Descriptor word count field of FIG. 4C are zero and transmission of the last character of the word has begun. If that same bit 46 is a zero, all 12 bits of the Command Descriptor word count field must be zero, and transmission of the last character started, before the Character Strobe Signal 602–56 will become a one. This signal is used at the peripheral device to allow a separation between groups of data, for example, on tape. Without this signal an ending procedure may be executed allowing the Input/Output Control Module to be released prior to completion of an instruction.

The fact that the complex device possesses data lines in the direction of the Input/Output Control Module, as well as in the direction of the peripheral device, allows the complex peripheral device the ability to transmit to the Input/Output Control Module up to eight possible binary combinations for ending an operation. These combinations are placed into the Status Field of the returned Result Descriptor of FIG. 4E. Further, the Status signals can be used to transmit control signals to the Input/Output Control Module causing it to alter its usual operation. This control is limited to three signals in the present configuration.

(3) *A simple read device (10).*—The Simple Read Operation begins by transmitting an input Start/Stop signal along line shown in FIG. 13 at reference 627–10. As previously stated, only two codes are possible with a Simple Read device. These two codes 10010 and 10011 are shown in FIG. 12. The code 10011 is used to control the device without data transfer whereas the code 10010 can be used to transfer data. It is this transfer signal on the Character Request line, referenced 627–12 of FIG. 13, which is used by the Input/Output Control Module to request information.

Since the data lines return in the direction of the Input/Output Control Module, they can be used to carry more status information.

(4) *A Complex read device (11)*.—Initiation of a Complex Device Read (11) operation is identical to that for a Complex Device Write (01) operation shown in FIG. 12. The record count field of four bits 13, 14, 15 and 16 and the instruction modification field bits 46, 47, and 48, as shown in FIG. 4C, are transmitted until the operation ends.

When the last character of the last word, designated on FIG. 4C by word count bits 1 to 12 occurs, the Input/Output Control Module will simultaneously signal over the Write Character Ready 602–12 and the Read Character Request line 601–12 of FIG. 15. The Complex peripheral device of FIG. 15 interprets this signal to indicate that no more characters will be accepted into memory.

All status conditions that apply to a Simple Read Device apply also to a Complex Read operation.

The Input/Output Control Module of FIG. 6 interprets a Complex Device Read operaton, as follows, provided that no control signals are received from the peripheral device.

Send the three Instruction Modification field bits 46, 47 and 48 with the four Record Count field bits 13, 14, 15 and 16, to the peripheral device over the seven Write Data lines 602–86 to 602–98 of the Complex Transposer of FIG. 15 starting two microseconds prior to the Read Start/Stop line 601–10 going high (1) and continue to do so until it goes low (0). Read each character from the seven Read Data lines 601–1 to 601–32 into the Information Register 400–46 of FIG. 6 near the leading edge of each Read Character Strobe 601–56 signal of FIG. 15. When the Information Register 400–46 is full, transfer a word to memory and start to count the word transfers. On the last character of the last allowed input word transfer, signal the peripheral device. When the Read Character Strobe goes low (0) following the last character transfer, terminate the operation and place appropriate status information in the returned Result Descriptor of FIG. 4E. Also, end the operation immediately if the peripheral device sends a terminating status code over the Status line 601–58 and the Read Data lines 601–1 to 601–4.

(D) *In process descriptor*.—The normal consequence of sending a Command Descriptor to the first non-busy Input/Output Control Module is to have it engage a peripheral device and return the In Process Descriptor shown in FIG. 4D. The device will thereafter control the rate of data transfer, if any, until a condition for ending the operation occurs. The Input/Output Control Module will then do the following: Return a Result Descriptor 4E with the appropriate status information to the memory. Release the peripheral device and send a signal to interrupt the Computer Module causing it to shaft from normal to Control mode. The Computer Module will examine the Result Descriptor and take appropriate action. If the first non-busy Input/Output Control Module detects a parity error in the Command Descriptor 4C, or if it finds that the Unit Available signal 600–54 from the addressed peripheral device is low (0), it will not disengage the peripheral device. It will, instead, return an In Process Descriptor 4D with 111–000 (for parity error), or 001–000 (for device not available), in the status field bits 17, 18, 19, 20, 37 and 38 of the descriptor.

(E) *Result descriptor*.—A Result Descriptor format is shown in FIG. 4E. It is returned to a memory module following the completion or interruption of the operation of a peripheral device. At approximately the same time that the Result Descriptor is being returned to memory, the Input/Output Control Module sends an interrupt signal to a computer module. The Control Module will then disconnect itself from the associated peripheral device, but it will continue to indicate a busy status to the memory unless the cause of the termination was a Release Descriptor. If not, it will continue to present a busy status to the memory until a Release Descriptor is received.

(F) *Descriptor status information (input/output control modules)*.—It is seen from the format of the In Process Descriptor 4D and the Result Descriptor 4E that both contain status information. The first three of the six Status bits 17, 18 and 19 contain Input/Output Control Module status information. The remaining three bits 20, 37 and 38 contain peripheral device status information. It will be understood hereafter that, when, as written together, these six bits 17, 18, 19, 20, 37 and 38 take the form XXX–000, the *I/O* control unit has caused the termination of the operation of the peripheral device. However, if these six bits take the form 000–XXX, the termination of the peripheral device has been caused by the device itself. Various combinations of the binary code in either the first three bits (*I/O* Module), or last three bits (Peripheral Device), will now be discussed.

(1) *In process descriptor status information*.—The In Process Descriptor will refer only to *I/O* unit status and have only one of three possible conditions as given above. The latter three status bits (peripheral device) will never be set. Therefore, XXX–000 will be the format with the In Process Descriptor. The three possible conditions are 000–000, 001–000, and 111–000.

The first condition 000–000 indicates that the operation is underway and should continue until a Result Descriptor is received by a Memory Module. The Input/Output Control Module and the peripheral device are now busy.

The next condition 001–000 indicates that a peripheral device is not available. The selected peripheral device is either busy or not ready. The Input/Output Control Module, however remains busy until released by a Release Descriptor. If the order code of the In Process Descriptor is 10001, the Set-Up Descriptor has been correctly received and the In Process Descriptor is then sent to the new address.

The last condition possible in the In Process Descriptor is 111–000. This indicates that a parity error exists in the received descriptor. The *I/O* Module will continue to remain busy until released.

(2) *Result dsecriptor status information*.—The status codes 001–000 and 000–000 as used with the In Process Descriptor do not appear in the Result Descriptor status format.

The Status Codes associated with the Result Descriptor are 010–000, 011–000, 100–000, 110–000 and 111–000. Code 101–000 is not used in either a Result or an In Process Descriptor.

These five codes are given the following meaning by the Input-Output Control Module.

010–000 The Input/Output operation has been interrupted by the receipt of a Release Descriptor before a normal ending has occurred.

011–000 Word count equals zero. The last word to an output peripheral device has been reached or an input peripheral device has reached the end of an allotted memory area.

100–000 No access to memory on data. A request for access to memory either to read or write has not been satisfied in a time limit of 100 to 200 microseconds.

110–000 This is a parity error indication from an input peripheral device. A character has been received from the selected peripheral device with an even parity.

111–000 This is a parity error indication in data to an output peripheral device. That is, a word was received from memory containing even parity.

(G) *Descriptor status information (peripheral devices)*.—As has been noted above, the three status bits 20, 37 and 38, are concerned with the Peripheral Devices. These are seven Status Code combinations for these devices as used in the present embodiment. They are: 000–001, 000–010, 000–011, 000–100, 000–101, 000–110, 000–111.

The meanings given each are as follows:

000–001 End of Record or Last Allotted Record of a Read Operation.

000–010 Parity Error or Malfunction when associated with Simple Write Device. On other device types it means various things, for example, on a magnetic tape unit it means end of file. On a card reader it means that the input hopper is empty. On a magnetic drum it indicates that the drum has not been addressed. On a card punch it means that no response has been received to status control.

000–011 Generally, this means that there is a peripheral unit malfunction.

000–100 The meaning of this code varies as follows: On a magnetic tape unit this indicates that the file was protected, while on a magnetic drum this indicates that a channel was protected. It indicates that a rewinding is being accomplished on a paper tape reader. Whereas, on a card punch it indicates that an illegal descriptor has been sent.

000–101 Here again the meaning varies as follows: on a magnetic tape unit the end of tape is indicated. On a paper tape reader this would indicate a local test was in progress, while a punch error is indicated by this code on a card punch. This also indicates that a flex writer was off line.

000–110 This is used by four (4) peripheral devices to indicate that memory access has been too slow for the device. This is used on those devices whose operation is ruined when memory access is delayed slightly, but not long enough to shut down as would occur with 100 to 200 microsecond delay when no memory circuitry is available.

000–111 This is almost exclusively used as a parity error indication. In the case of a paper tape reader, it is a special case parity error, mainly that of an isolated blank character.

(H) *Descriptor status modification by peripheral device*.—A peripheral device can change the operation of the Input/Output Control Module by placing a one on its Status line. The presence of this signal when associated with selected order codes cause the control unit to perform certain functions. For a simple write device, which has no way to modify the Status signal, and for most of the order codes presently used on the data lines with the Status signal, this change in operation is simply to have the control unit load Status Register 400–38 of FIG. 6 and end the peripheral operation. When this Status signal is received from a simple write device, a status code of 000 010 is assumed. On simple read devices, however, the order code is taken from transposer data lines 72, 74, 76, 78, 80 and 82, FIG. 13. A number of control signals presently utilized in association with this status signal by the described embodiment will now be discussed.

(1) *Terminal peripheral operation*.—The following codes when associated with a one on the Status line are interpreted as a command to end of operation:

| | | |
|---|---|---|
| 00 010 | 00 011 | 00 001 (write operation) |
| 00 100 | 00 101 | |
| 00 110 | 00 111 | |

The Control unit loads the three least significant digits into the Peripheral Device bits of the Status Register 400–38. Whenever any bits of the Status Register become set, the Input/Output Control Module automatically returns a Result Descriptor, disconnects from the Peripheral Device, and interrupts a Computer Module.

(2) *Conditionally terminate peripheral operation*.—This control signal results from receiving an End of Record code, 00001, on an input read operation. When the Record Count Field of the Descriptor Register is one, this code will act as a terminate code, loading 001 into the peripheral Device portion of the Status Register 400–38. When the Record Count field is not one, this code will cause the four bit Record Count field to be counted down, allowing a maximum of 16 End of Record codes to be transmitted before terminating.

(3) *End of word to peripheral device*.—On an input read operation, this code will be used to return any partially assembled word in the Information Register 400–46 of the Input/Output Control Module to memory. If at least one character has been loaded into the Information Register since the last memory access, the most significant end of the Information Register will be filled with Delete characters (all one's) and the word will be transferred to a memory location, the Information Register will be reset, and the character counter will be set to zero. If no more characters have been received since the last memory access, no memory access will be made, and the Information Register 400–46 of FIG. 6 will remain reset and the character count will still be zero.

The Input/Output Control Module will acknowledge the receipt of the code by responding over the Read Character Request line 627–12 of FIG. 13 in either case.

(4) *Cancel current word to peripheral device*.—The code, 01000, will be used on both read and write operations, and will have different, though similar, effects.

On read operations, Cancel Current Word will be used to reset the Information Register 400–46 and to set a character counter to zero without causing a memory access. The Word Count field and the Memory Address field of the Descriptor Register 400–48 of FIG. 6 remain unchanged. The Input/Output Control Module responds over the Read Character Request line 627–12 of FIG. 13. This is presently used by the Magnetic Tape Unit to reject flaws in the Inter-record gap on the tape.

On write operations, Cancel Current Word is used to reject the present contents of the Information Register 400–46 of FIG. 6, and to request access to the next memory location. The Information Register is reloaded with the contents of the new memory location but the character count is not changed. The Input/Output Control Module responds by signaling over the Write Character Strobe line 628–12 of FIG. 14.

(5) *Count back memory address of descriptor*.—The code, 10000, causes the Word Count field to be counted up one word and the Memory address field to be counted down one word. Both counts are in the opposite direction from their usual count signal.

In the present configuration, the Card Punch uses a series of these signals at the end of a row to count the memory address back to the state at the beginning of the row, providing that there is at least one more row to be punched on this card. A Cancel Current Word is then given to pick up the contents of the first word of a row.

MEMORY MODULES (CMM)

Refer now to FIGURES 5A and 5B which taken together illustrate a block diagram of one of the sixteen identical memory modules shown in FIGURE 1A as reference 400. Information is brought into the memory module by five busses of twelve lines each in 12 bit syllables. Of these five input information busses, four are from computers C1, C2, C3 and C4. The four input information channels from the computers can receive information from such computers simultaneously provided they do not seek the same memory module. The remaining bus is the input/output information bus. While memory access may be had by any one of the ten input/output modules, only one of these modules may transmit information at any one time to the memory. By reference to FIGURE 5B it is seen that input gates 10, 12, 14 and 16 receive the inputs from the four named computers. The remaining input gate 18 is fed by all ten input/output modules. The selection on an input/output bus is made on a time-sharing basis and only one input is selected at any one time. The five input gates 10, 12, 14, 16 and 18 feed directly into the five input bus selection gates 20, 22, 24, 26 and 28. It is at this point that the five parallel inputs become serial. Only one of the five busses may be selected at any one time to be fed into the bus selection mixer 30. The selection gates 20, 22, 24, 26 and 28 are triggered from a crosspoint bus selection matrix 70. The crosspoint bus selection matrix 70 receives information from the conflict resolver 66. This conflict resolver is the subject of a separate copending application, Hopper et al., Serial No. 89,525, where it is explained in detail, and the disclosure of that application is herein incorporated by reference. For purposes of the present application, it is only given as background information to more readily explain the input-output system. It is this conflict resolver 66 which maintains proper order among the various requesting modules seeking memory access. The memory module address selection matrix 62 is fed by the output from the four computers C1, C2, C3 and C4, as well as from the ten input-output modules. Each of these requesting modules is coupled to the memory module address selection matrix 62 by four lines. The use of four lines allows sixteen possible binary numbers. It is therefore possible to select any one of the total of 16 memory modules through the use of these named four lines. So long as the input requests from the computer modules and the input-output modules do not conflict, i.e., not simultaneously received, the conflict resolver 66 merely passes these memory requests into the crosspoint bus selection matrix 70 in the order received. However, in the event of a simultaneous request for this particular memory module they are lined up in the order given by a specified priority.

Ordinarily, only two further pieces of information are necessary to the memory module in order for its proper operation. They are (1) a Read or Write Level signal and (2) a Memory Access Request. By referring to FIG. 5 at reference numeral 56 it is seen that each of the requesting modules C1, C2, C3 and C4 as well as all ten input-output modules feed one line into the read or write level request gates 56. The Read/Write signal is received at the same time as a request for memory access at gate 60. This signal determines whether the operation to be performed is an order to write information into, or read information out of the memory.

Reference numeral 60 designates the memory access request gates. These indicate to the memory modules which of the requesting modules is seeking access to the memory. In the present inventive concept, we have a third possibility. These are the input-output descriptor request gates 58 which receive descriptor requests from all four computer modules C1, C2, C3 and C4. These signals instruct the memory module to issue a descriptor to an Input/Output Control Module from a particular memory location. The Input/Output Control Module selected is the one that has been idle and has the lowest sequential number. The outputs of the memory request read or write gate 56, the input-output descriptor gates 58 and the memory access request gate 60 are fed to the master control matrix 68 (also hereinafter designated as master control switching unit, and master control and timing unit). At the same time, the output of the crosspoint selection bus 70 is fed to the master control matrix. The result of this combination of information is to determine that access to the memory module is requested. Further, it specifies the identification of the particular requesting module and the memory operation to be performed. The control information from the master control matrix 68 is returned to a plurality of locations. First, a control signal is coupled to the memory access gates 60 to permit some requesting module access to this particular memory module. If a descriptor transfer is desired to an input-output unit, a second control signal is operatively coupled to descriptor transfer gate 74, to allow a Descriptor Cross-point Signal (XPD) to be coupled to all input-output control units. The Master Control Matrix 68 also operates Descriptor Inhibit Gate 76. The operation of gate 76 will signal all fifteen other memory modules to refrain from issuing a descriptor.

A second Descriptor Inhibit Gate 64 also receives these signals from all fifteen other memory modules. Thus only one memory module can issue a descriptor at any one time.

The memory address control register 80 is a 12 bit shift timing register whose shift input is a 50 microsecond pulse every 0.33 μsec. Its output is sensed in parallel for a 1 which is set in the least significant bit and shifted down the register in twelve steps. The least significant bit is designated MTO$\overline{X}$P, the next is MTOXP, followed by MT1 through MT10. At MTOXP the address to be selected is brought into the Memory Address Register (MAR) 84. This address is then decoded in the manner discussed below in the MAR description. At time MT1 the first 12 bits are loaded into the Memory Information Register (MIR) 42 (FIG. 5B). The second 12 bits at time MT2; at MT3, the next 12; and at MT4 the 12 most significant bits are loaded. At time MT5 the parity bit is loaded. At time MT6 the information write deliver 92 is pulsed and at time MT7 through MT10 a word is written into memory 94. During memory readout the address is transferred to Memory Address Register MAR 84 at time MTOXP and the information follows at times MT1, MT2, and MT3. At time MT4 the 12 least significant bits are transferred from the Core Memory 94 to the Memory Information Register MIR 42. The next 12 bits at time MT5; the next 12 at time MT6; the most significant 12 bits at time MT7 and the parity bit at time MT8. Since the ferrite core memory of the present system has a destructive readout, the information is rewritten at times MT7 to MT10 by connecting the write driver 92 to the output of the Memory Information Register.

Memory Address Register MAR is a 12 bit register. The memory address at which a word is to be written into or read from is transferred from the appropriate computer module to the MAR. The MAR is then decoded by two 8 x 8 matrices of the Address Decoder 86 and 88, which in turn feed one 64 x 64 Word Selection Matrix 90. The six most significant bits are decoded by one 8 x 8 matrix of the Address Decoder Drivers (88) which then selects one of the 64 read or write drivers. The driver selected will then give one input to the 64 x 64 Word Selection Matrix 90. The six least significant bits are decoded by the other 8 x 8 matrix of the Address Decoder 86 to select one of 64 switches which in turn give the second input to the 64 x 64 matrix. The word line is now pulsed by either a read pulse or a write pulse.

The Memory Information Register 42 will accept the data to be written into memory output if a write command has been given or it will receive the information that is read out of memory if a read command is given. The MIR is a 49 bit register holding 48 bits of information and one parity bit. During the write operation the data to be written is loaded into the Memory Information Register 12 bits at a time with the parity bit being loaded by itself after the MIR is full. The MIR output is coupled to 49 core information drivers (92) which in turn pulse each bit line with either a positive or a negative current. This current will either add to or subtract from the existing word select current from matrix 90 and either a ONE if added or a ZERO if subtracted, is written into memory.

During the read cycle the information is read out of the specific memory location addressed and the 49 bits go through the sense amplifiers 96 and the forty-nine read gates 98 to forty-nine single shot multivibrators, the single shot inputs are then fed to the MIR where the data is sent to the appropriate Computer Module 12 bits at a time. The information is also rewritten into the same address from which it was destructively read out as the output of the MIR always feeds the core information drivers 92.

(A) *Write operation.*—Refer now to FIG. 5A. When a write command is given signal WL will be present at Read/Write Request Gate 56. A signal WL coupled to gate 56 also is coupled to, and enables, the input to the MIR 42. At MTOXP the address is sent to the Memory Address Register 84 and a write drive and a word line are selected. At times MT1, MT2, MT3, MT4 and MT5 the word to be written is transferred to the MIR. The Memory Information Register 42 controls the information drivers 92. At MT4 time, a clock pulse is gated to write delay and information delay lines, not shown. At this time the pulse is stretched to 1.32 μsec. and sent to the write driver 88 that was selected by the associated 8 x 8 decoding matrix. The address decoder drivers 88 and switches 86 provide an input to word selection matrix 90; in turn the matrix 90 provides a current through the selected word line of memory 94. This current is equal to ⅔ of the current needed to change the states of the cores. The pulse gated to the memory information register (42) is delayed for .5 microsecond and stretched to 1.65 microseconds, then sent to the 49 information drivers 92. If a ONE exists at the second input to the information driver 92, a pulse of current will exist at the output that will add to the current pulse on the word line and a binary ONE will be written for that bit. If a ZERO is coupled to the information driver 92 from the MIR, it will have a current output that will subtract from the word drive current and the resultant ⅓ current will not write a binary 1 in that bit position thus effectively writing a binary 0.

(B) *Read operation.*—In order to read, the conditions must be set up as follows: a read command must be given, this creates signal RL at gate 56 and removes WL from that gate 56. Since WL is removed, no information can come in from the computer modules 201, 202, 203 204 also indicated respectively as C1, C2, C3 and C4. Information to the Memory Information Register 42 now comes from the 49 single shot multivibrators (read gates 98). At MTOXP, the address from which the word is to be read is transferred to the Memory Address Register 84, and decoded and one of the 64 drivers 88 is selected. At MT3, a clock pulse is gated and delayed .5 microsecond through the decoder drivers 88. The output of the selected driver 88 and a switching pulse 86 will provide an output to matrix 90; in turn, matrix 90 provides a current through the selected word line of memory 90 which current will set each core in that line to the zero state. Each core that is in the one state will go to the zero state and induce a pulse of current into the associated sense winding which is connected to a respective sense amplifier 96. A core in the zero state will remain so and no current pulse will be induced. The sense amplifier output will be sent to the forty-nine read gates 98 and when the strobe pulse, not shown, arrives it will be passed through the gates that have been enabled and set the respective Read Gate Single Shot 98. The output will be gated through to the MIR and sent out in 12 bit syllables to the Computer or *I/O* Modules at times MT4, MT5, MT6, MT7 and MT8. At times MT6 through MT10 the information in the MIR will be rewritten into its original memory location, for further reference.

By referring again to FIGURE 5B, the output of the bus selection mixer 30 is serially fed a syllable at a time as selected by the cross-point bus selection gates 70 from the bus selection gates 20, 22, 24, 26 and 28. Since the information is coming into the memory from the bus selection mixer 30, this information is to be written into the memory. Therefore, the output of the bus selection mixer 30 is fed by 12 bit syllables to write selection gates 32, 34, 36, 38 and 40. At the same time one 12-bit syllable is fed to memory address input selection 82. It is this register 82 which indicates the memory address in which this information is to be written. The syllable output of each of the write syllable selection gates 32, 34, 36, 38 and 40 are fed into the information register 42. This information register is a full word length of 48 bits plus one parity bit. The overall 48 bit word length is divided into four 12-bit syllables, A, B, C and D. The 49th bit is the parity bit.

Output selection gates 44, 46, 48, 50 and 52 determine the output syllable order of the word coupled to the output selection mixing gate 54.

The output of the mixing gate 54 is in the form of a 12 bit syllable. It is in this form that the information is sent from a memory module to any input-output control module (401–410) or to a computing module 201 to 204. The destination of such memory information, of course, depends on the instructions received by the memory. It may be that the requesting module desires to have the memory information returned to itself. However, in the case of an input-output operation, the computing module will issue a descriptor request to the memory module ordering it to send a particular descriptor word at a particular memory location of the core memory to any input-output control module which is not busy and which has been in that condition for the longest period.

Upon completion of an input-output operation, an input-output module will go to its non-busy state and line up behind other such modules already in that non-busy condition.

The memory module about to issue a descriptor for an input-output operation will select the module at the top of this line of idle units.

COMPUTER MODULE (COM)

The Computer Module (FIG. 11) consists of three functional areas: the arithmetic unit, 200–10, the local storage section (thin-film memory), 200–70 and the remainder which is the control section 200–30. The first area, the arithmetic unit, is made up of three registers, A 200–16, B 200–12, C 200–18 with associated controls. The second area (200–70) is a set of 53 registers contained in a small thin-film magnetic storage. The third area is the control section which includes capability for indexing, address accumulation, indirect addressing, and the command and subcommand matrices.

The Memory *I/O* Register (L and M) 200–32, is a multi-purpose register. To initiate a memory transfer, the memory address is transferred to the Memory *I/O* register. The portion of this address is the L register which designates a specific Memory Module and is sent as D.-C. levels to each of the sixteen memory modules of FIG. 1. A switch interlock matrix is formed by the Computer Module cables cross-coupling with the Memory Module communication lines. Memory Module addresses and information words entering the Computer Module from the memory module are transmitted through the M register 12 bits at a time.

The A register 200–16, B register 200–12, and C register 200–18 are the working arithmetic registers of the Computer Module. All three registers are capable of shifting in optimum combinations of 12, 6 and 1 places to the right and iteratively 1 place to the left.

The function register (F) 200–50, is a 12 bit register that holds the operator syllable presently being executed and provides the D.-C. levels for driving the command and subcommand matrices.

The five operand registers include four operand stack registers 200–72 which make up the thin-film operand stack, and the thin-film C (TFC) register 200–74 which is used to store the least significant half of a double-length product and the remainder in division operation.

The two-program-storage registers (PSR1 and PSR2) 220–76, provide storage for eight instruction syllables and permit overlapped instruction fetch during long instructions.

The base address register (BAR) 200–78 possesses the base address of the data direct-address area. The base program register 200–80 (BPR) holds the base address of the program address area. The program count register 200–82 contains the address of the next instruction to be fetched from memory. The subroutine base address register 200–84 (SAR) stores the base address of a list of subroutine storage register 200–86 (SSR) receives subroutine return information, i.e., the former contents of the BAR (200–56) and PCR (200–82).

(A) *Interrupt.*—Each Computer Module has an interrupt register 200–56 which can be set through the interrupt mask register 200–52. When a particular condition has set a one at some bit position in the interrupt register 200–56, a program interrupt occurs. This interrupt stops the program being executed, stores sufficient registers to allow continuation of the interrupted program at a later time, and transfers control to a routine in the automatic operating and scheduling program (AOSP) to service the interrupt.

The interrupt system registers provide storage for data presently in the operational registers in the event of an interrupt. The interrupt base address register (IAR) 200–88 contains the base address of the interrupt routines; the contents of this thin-film register are protected during the normal operation mode. The interrupt storage register 200–90 (ISR) holds interrupt return information i.e., the former contents of the BAR 200–78, BPR 200–80, and PCR 200–82. The interrupt program register 200–92 (IPR) provides storage for the contents of the presently addressed PSR 200–76 during interrupt. The interrupt dump register 200–94 (IDR) holds the PSR 200–76 and repeat controls for interrupt return. The power failure dump register 200–96 (PDR) stores the contents of the control flip-flops and the flip-flop interrupt register in the event of a power failure.

INPUT/OUTPUT CONTROL MODULE (IOM)

Now refer to FIG. 6 which is a detailed block diagram of one of the IOCM's indicated as 400 on FIG. 1. FIG. 1 indicates that there are a total of ten modules since there are two modules, A and B, in each of five cabinets. The cabinets are indicated in FIG. 1 as 401, 402, 403, 404, and 405. Since all of these input/output control modules are identical, only one of such modules will be described herein. FIGURE 9 illustrates the input and output interface of an IOCM.

FIGS. 7 and 8 illustrate the control module in its input and output operation, respectively. There are three paths of information through a control module. A common descripter path, an input, and an output path.

The memory descripter is gated through the input selection gates, coupled into and stored by the control and storage registers, and finally returned to memory through the output selection gates. The flowpath of a descriptor is common in both input and output operations of the module.

FIGURE 7 illustrates the input flowpath. The information flow during the input operation is from the peripheral devices through an information register and then transferred into memory.

FIGURE 8 shows the output flowpath. It is seen that the operation is bidirectional, since this output information is gated from the memory into the information register and selectively coupled to the output peripheral device. Communication with the peripheral devices, both input and output, is by six bit character, whereas communications with the memory is by syllable. A syllable is equal in length to two characters.

In particular, the descriptor information is received by the input-output receiver 400–16 of FIGURE 6. The information is then coupled into a memory input gate 400–14. Simultaneously, two additional information control signals are received by the Input/Output Control Module from each of the sixteen memory modules. One signal is received by each of the sixteen descriptor crosspoint lines (XPD) 400–10. The second signal is received from the sixteen information crosspoint lines (XP) 400–12. The combination of these two signals (XP and XPD) is coupled into the Memory Input Selection Matrix 400–24. One of the sixteen groups of twelve memory input lines (400–14) is selectively gated through the memory selection gates 400–26.

The selected memory information is fed simultaneously to a twelve bit Control and Parity Register (CPR) 400–38 and to either the Descriptor Register Input gates 400–36 or the Information Register Input gates 400–34. The choice of Descriptor or Information Register is determined by the Master Control Switching Unit 400–68. For the Descriptor Flowpath, this determination is the Descriptor Channel Input Gates 400–36 shown in FIG. 6. The Descriptor Information is fed into the Descriptor Register 400–48 in a syllable form. Control information is also transferred to the Descriptor Base Address Register (DBAR) 400–42 as well as into a Module Comparator 400–44. It is the function of this comparator 400–44 to indicate to the memory whether or not this is the module to be selected. In the event that this comparison indicates that this module has the highest priority a full descriptor word (48 bits) is fed into the Descriptor Register 400–48.

The Descriptor Register 400–48 will transfer this Descriptive word by 12-bit syllables, as selected by gates 400–54 into the Output Register 400–64. Also coupled to the register 400–64 is the information containing the memory module address and the parity signal. This is also gated into the Output Register 400–64 by Selection Gates 400–62 from the Base Address Register 400–42 and Parity Generator 400–40. In addition, the output of the input-output designation register 400–52 will be fed into the memory address and parity selection gates 400–62. Upon receipt of the proper control signal from the Master Switching Control 400–68, the memory address and parity selection gates 400–62 will selectively couple its output to two locations. First, it will couple the selected memory module address to the Input-Output Module Line Driver 400–70. Secondly, it will trigger the transfer of the Output Register contents 400–64 to same line drivers. These Line Drivers couple the control module memory output back to the Memory. Four of these memory return lines decide the memory module address, while twelve lines give the line address within the memory module as well as transfer information to the selected line.

(B) *Input information flowpath.*—By reference to the System, FIG. 1, the input information flowpath, is from the Peripheral Devices, 700 through odd-numbered Peripheral Transposers 701 and their respective Cables of the Input-Output Exchange 500, through the Input-Output Control Modules 400, along the Input-Output Bus of the Switch Interlock 300 and into the Memory 100.

By particular reference to the Input-Output Control Module of FIG. 7, it is seen that the information from peripheral devices 700 will be coupled into the input receivers 400–18 and onto Device Input Lines 400–20. Upon receipt of a selection control signal from Master Switching Control 400–68, the Input Device Selection Lines 400–22 will selectively operate certain Terminal Equipment Selection Gates 400–28. Peripheral information will be gated character by character into a two Character Buffer Register 400–32. This information will be received by an input parity check 400–30 and if found satisfactory, will so indicate to Master Control Unit 400–68. The two character buffer 400–32 is a register for temporarily storing each of the 6-bit characters of an information word received from a peripheral device. It is this two character buffer 400–32 which allows an overlap of operation. This enables the IOCM two character times to access memory and transfer the word while the first two characters of the next word are being received.

On an input operation, the information is received by character in a serial fashion into the information register 400–16. To fill the register, it takes eight character transfer times. Consequently, it would take eight character times before the control module would request the next information transfer. Using the disclosed two character buffer 400–32 the first and second characters of the next word are stored while the IOCM is transferring the present word to memory.

On an output operation, and as will be more fully described hereinbelow, at the end of the eighth character transfer, the module will request the next information transfer. When this next transfer begins, the two character buffer will simultaneously dump the seventh and eighth characters into the seventh and eighth locations of the information register and accept the first and second characters of the next transfer word.

This same character buffer 400–32 is also used in the output operation of an Input/Output Control Module as shown by the dashed lines of FIGURE 6. The output operation will be described under the output flowpath.

The information which is transferred between the peripheral device transposers and the information register 400–46 is in character (six bits) plus parity form. The information register 400–46 is a full word (48 bits plus parity) length long. It can store eight characters (four syllables) of information. The rate of character transfer may be up to 500 kc. The information transferred between the information register 400–46 and the memory modules is in the form of twelve bit syllables. Thus, it is seen that this syllable transfer rate may be up to one half the character rate per 250 kc. maximum. The communication between a control module and a device proceeds at a rate determined by the device and the control module remains connected to the device for the duration of an input/output operation.

The character rates of some typical peripheral devices are given below. Also given is the corresponding core memory access rate. In the Input/Output Control Module data is packed eight characters per memory word; therefore, it generally requests memory access at one eighth the character rate of the device that it is interconnected with.

| I/O Device | Character Rate Per Second,[1] kc. | Memory Access Rate, kc. |
|---|---|---|
| Drum Storage Unit | 496.0 | 62.0 |
| Card Punch (Binary Mode) | 136.0 | 17.0 |
| Card Punch (Alpha Mode) | 68.0 | 8.5 |
| Magnetic Tape Unit | 66.7 | 8.3 |
| Magnetic Disc Unit | 62.5 | 7.8 |
| Card Reader (Binary Mode) | 6.7 | .833 |
| Card Reader (Alpha Mode) | 3.3 | .416 |
| Line Printer | .667 | .083 |
| Keyboard Printer | .010 | .0012 |

[1] Actual rate of handling characters within Input/Output Control Modules, not an average character rate.

The Information Register will need access to the memory module only when it is full, which as has been stated, would require eight character transfers. Prior to the transfer of such information to the memory, access must be sought and granted. This is performed by the Memory Request signal (RQ) from Master Control 400–68 of FIG. 7.

Input Information from the peripheral devices will be written into the memory. Therefore the signal necessary from the Master Control Switch 400-68 to instigate this operation in the memory will be the WRITE Level (WL) signal. The READ Level (RL) signal wall cause data to be read out of the memory to be coupled to the peripheral device.

(C) *Output information flowpath.*—The third and final flowpath of information through an Input/Output Control Module is in the output direction. Generally, the information comes from the memory module through a control module and into an output (even numbered) peripheral device. By referring to FIG. 8, in which the output operation of an input/output control module is shown, it is seen that the output information is received from the memory into the memory input gates 400-14 by way of the input/output receivers 400–16. The Descriptor Crosspoint lines (XPD) 400-10 and the Information Crosspoint lines (XP) 400-12 indicate to the Memory Input Selection Matrix 400–24 the memory output to be selectively coupled through Memory Select Gates 400–26. The ouput of the memory select gates 400–26 may be sent to two registers. One is the Control Parity Register 400–38, and the other is either the Descriptor Channel Input Register 400–36, or the Information Channel Input Register 400–34. The Control Parity Register 400–38 contains twelve flip-flops for temporary storage of this control information. The first eleven flip-flops receive and store the new base address information and the twelfth flip-flop stores the parity bit. The Descriptor Channel Inputs are selected by gates 400–26. The selected input is in a syllable form (12 bits) and is fed into the four syllable Descriptor Register 400–48 in the order selected. The Information Channel Input gates 400–34 transfer the information in the order in which it is to be stored in the Information Register 400–46 in syllable form of 12 bits each. This it will be remembered is different than in the input operation described above in which the information register received information from the peripheral devices in character (6 bit) form. The Information Register 400–46 in the output direction sends out information in character form to the output (even numbered) peripheral devices. Thus, it is seen that the output lines from the Information Register 400–46 contain eight separate character lines. The Character Selection Gates 400–50 couple the output information in the order selected to a Data Output Register 400–60 where a Parity bit is added from Parity Generator 400–58. A two character Buffer Register 400–32 temporarily stores the last two characters (where they are dumped from Information Register 400–46) for use by the output peripheral devices. The operation of the two character buffer 400–32 in this configuration, however, is different from that referred to in the input direction, but it maintains its overlap advantage.

In the output operation, the TCB (Two Character Buffer) temporarily stores the final two characters of information going to the output peripheral device. It receives this information from the seventh and eighth characters of the information register 400–46. Since the two character buffer can clear (dump) the information register two character times prior to the time which it would be normally empty, the information register will indicate the end of operation and will thereafter be available for the next information transfer at the time when the sixth character has been transferred. The dash lines of the two character buffer 400–32 from the information register 400–50, shown in FIG. 6, indicate the second portion (output) of the two character buffer. In the solid-line configuration, indicated in FIG. 7 the two character buffer 400–32 is shown in its output position.

Thus, in the output direction, the two character buffer 400–32 receives a two character dump of information from the Information Register rather than dumping two characters into it as is done in the input operation. The output of the Information Register 400–46, and the output of the Descriptor Register 400–48, is coupled to the Output Selection gates 400–54. In this way, the information may be returned to a new memory location through the Output Register 400–64 and the Line Drivers 400–70. It is possible to store information in the memory from the information register 400–46 through the output register 400–64 and the Line Drivers 400–70 to any new memory location that is desired. A new memory location is specified by the Descriptor Register 400–48 if no parity error is present.

The information coupled from the Information Register to the Terminal Equipment Output Gates 400–50 is fed to three locations; the Output Comparator 400–56, the Output Parity Generator 400–58, and the Terminal Equipment Data Output Channel 400–60. The Output Parity Generator and the Terminal Equipment Data Output Channel 400–60 have been discussed. The Output Comparator 400–56 will check the output information going to the peripheral devices with an input test signal—may be made to do so with the input information received from the memory—and in the event of a difference, will issue an error signal (OCE) indicating the information being transferred to the peripheral devices is in error.

This Input-Output Control Module is universal in that it is identical regardless of the type of input or output peripheral device utilized with it. It is completely capable of bidirectional operation while using the same Information Register 400–50 of FIG. 6, regardless of the direction of information flow.

Each Input-Output Control Module is allotted two adjacent storage locations in the memory to indicate individual module status. These adjacent locations referred to as the A and C lists are shown in FIG. 10. The even numbered locations of the A list will contain the IN Process Descriptors while the odd numbered locations of the C list will contain Result Descriptors. The A and C lists are situated in the same memory module that contains an automatic operating and scheduling program subroutine. This is done to permit the automatic operating and scheduling program to inspect the contents of this A and C list and initiate appropriate action based on its findings.

Refer to FIG. 10 and assume that the list is contained in a particular memory module whose address locations are 2,000 to 2,023. This would total a number of twenty adjacent storage locations which are needed to contain the A and C locations for the total of ten input-output control modules. The A and C locations for the ten input-output modules would be as shown.

The base memory address of the A and C descriptor list is transmitted to every Input-Output Control Module in the form of a Setup Descriptor. The Setup Descriptor inserts a total of eleven address bits in the Base Address Register 400–42 of FIG. 6. The four most significant bits indicate the memory module designation and the seven least significant bits are the seven most significant bits of the 12-bit literal address. The five remaining bits of the literal address are made up by the IOCM number and the logic of the individual Input/Output Control Modules to give each module a unique descriptor return address.

Figure 3:
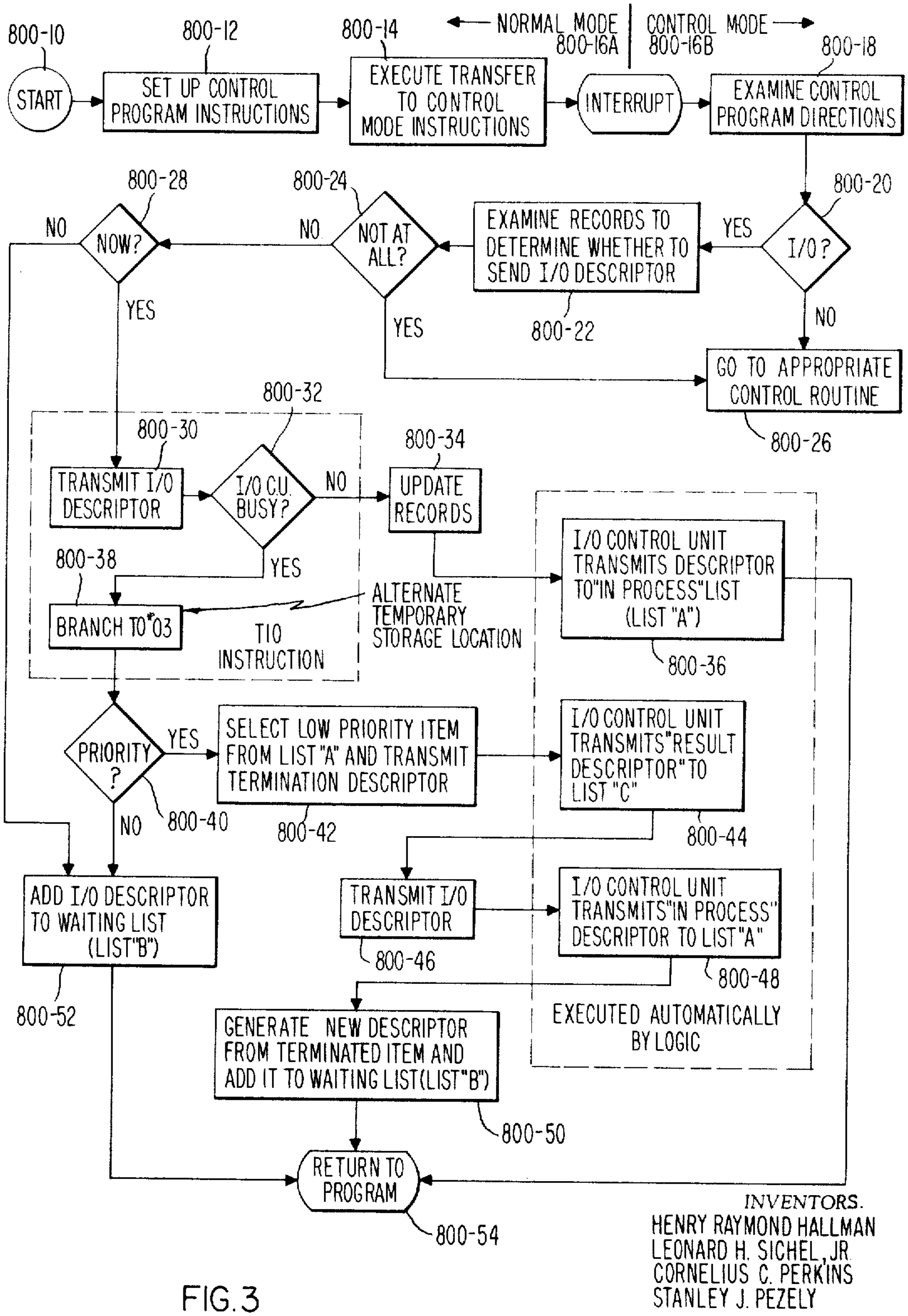
FIG. 3 is a pictorial signal flow diagram of computer operation for initiation of an input-output operation.

(D) *Logical operation of I/O module in system.*—By reference to FIG. 3, a logical flowpath may be followed which will illustrate the use of the above described Input/Output Control Module in conjunction with the Descriptors of FIG. 4 and the table of FIG. 10. By reference to this drawing in the upper left hand corner, we have a start operation 800–10. The setup control program instructions 800–12 indicate the initiation of computer operation for input-output operation. Following this, as has been noted, the computer will transfer to a control mode and receive instructions therein. Upon the execution of this transfer 800–14, an interrupt is caused which shifts the processor from its normal mode 800–16A to its control mode 800–16B. Once into its control mode, the processor will examine the control program directions 800–18 and determine whether or not an input-output operation is to be performed 800–20.

If the answer to this question is "yes," the processor will examine records contained in the memory 800–22 to determine whether to send an Input-Output Descriptor at all 800–24. If the answer to this question is "yes, do not send a descriptor," it will go to another control routine 800–26. In the event that the processor is to send an input-output descriptor, the next question that is to be determined is whether or not it is to do so now 800–28. If the answer to this question is "yes," a Transmit Input/Output (TIO) instruction will be issued 800–30 by the computer processor. However, should the answer to this question be "later" rather than "now," an *I/O* Descriptor will be added to a waiting list which we call a waiting list B800–52. Upon issuance of a TIO instruction, the next question asked is whether or not the Input/Output Control Module is busy 800–32. If all Input/Output Control Modules are busy, and the answer therefore to this question is "yes," the processor is given directions to branch to an alternate address location 800–38. It must now be determined whether or not this operation being sidetracked has any priority 800–40. If a priority does exist for this particular input/output operation then a lower priority item will be selected from list A and a termination descriptor will be transmitted 800–42 to an IOCM having this lower priority. This IOCM will thereafter transmit a Result Descriptor 800–44 to the above referred to location C (FIG. 10). The receipt of this Result Descriptor by the computer will cause the processor to transmit this higher priority Input/Output Descriptor 800–46 to the IOCM module whose operation has been pre-empted. This IOCM will in turn transmit an In Process Descriptor 800–48 which will be added to Location A of table referred to above (FIG. 10). If no priority exists at 800–40, the Descriptor is added to the waiting list for execution when an IOCM is available, 800–52.

In referring again to the lower priority item that has been terminated 800–42, a new descriptor will be generated for this terminated item 800–50, and this new descriptor will be added to a waiting list B for later execution. Following the generation of this new descriptor, the processor will return to its normal mode and renew the execution of the program which had been interrupted 800–54.

(E) I/O *Module selection.*—The First Non-Busy *I/O* Control Module is selected as follows. After a TIO (Transmit Input/Output Instruction) has been initiated by a computer, the computer notifies the memory to send a Setup Descriptor to all IOCM. The Memory Module containing the Setup Descriptor will send a signal XPD (Descriptor Cross-Point) down the *I/O* Bus to all IOCM's. This descriptor crosspoint signal (XPD) will start the timing control of the IOCM. This timing control 400–68 of FIG. 6 starts a cycle that is divided up into 12 equal parts. These parts are referred to as IT0 through IT11. The IT indicating the I for input-output, the T for timing and the numeral indicating the segment of the total 12. Each Input/Output Control Module will contain a busy (BY) flip flop (not shown in FIG. 6). This flip flop will be in either the set (busy) or the reset (non-busy) condition. This flip flop on the selected control unit will be set by the cross-point descriptor (XPD–400–10, FIG. 6) signal sent down the *I/O* Bus.

(1) *Load setup descriptor sequence*—(a) *First Non-Busy I/O Module (FNBI)*.—

(1) The computer executes an unconditional TIO instruction to send the setup descriptor to all *I/O* Modules.

(2) The memory module containing the Setup Descriptor sends an XPD signal down the *I/O* bus. Signal XPD start the *I/O* clock, sets BY flip flop which sets the Flop-Flop DS, thereby enabling the input gates 400–36 to the Descriptor Register 400–48, FIG. 6. Signal DS sets the descriptor transfer control flip flop (DTC) enabling the transfer gates between the Descriptor Register and the Output Register 400–64.

(3) This DS flip-flop will load the Setup Descriptor into the Descriptor Register 400–48 at times IT4 to IT7; simultaneously the Setup Descriptor's four syllables will be checked for parity as they pass through the twelve flip flop Control and Parity Register CP1 to CP12, 400–38 of FIG. 6.

(4) At IT4, the least significant syllable which contains the order code will be sensed to determine whether this is a Setup or Terminate descriptor. The order code, 10001, indicates that this is a Setup Descriptor, therefore Base Address flip-flop BAC is set at IT5.

(5) At IT7, the new base address is loaded into the Control and Parity Register 400–38, and occupies eleven of the twelve CP flip-flops CP1 to CP11.

(6) At IT8, the parity bit is entered into CP12 for an overall odd parity transmission.

(7) At IT9, parity is checked by sensing for the presence of parity error signal PEM. If PEM is present, then status bits indicating a parity error is set in Descriptor Register flip-flops DR17, 18 and 19.

(8) At IT10, RC is set, this flip-flop indicates the memory access condition of the *I/O* Module and the BAR is reset if no parity error occurred.

(9) At IT11, the base address flip-flop BAC reset signal and a transfer address flip-flop signal ATBAR are combined to allow the new base address into the BAR. Flip-flop DS is reset.

(10) At time IT0, the signals for memory request RQ and for Write Level WL are produced. A new base address is transferred to the memory module requesting the storage location for the In Process Descriptor, which is to be returned from the *I/O* Control Module.

(11) The memory replies with a cross-point signal XP. This signal indicates that access has been obtained to that memory module. The cross point signal XP will start the input/output timing control 400–68 counting and thereby terminate IT0. These are twelve IT signal segments IT0 to IT11. The time IT0 indicates that the clock for the timing counter for memory communication is down to zero. This places the least significant syllable from the Descriptor Register 400–48 into the Output Register 400–64. The remaining three syllables of the Descriptor Register 400–48 are now transferred out to the memory module at times IT1, IT2 and IT3.

(12) At time IT4, a parity bit is transferred to the memory module.

(13) At time IT5, the base address control flip-flop BAC is reset and the Descriptor Register 400–48 is cleared by a signal RDRC.

(14) At time IT10, a flip-flop DTC is reset. This is the descriptor transfer control flip-flop which enables the transfer gates between the Descriptor Register 400–48 and the Output Register 400–64 of FIG. 6. The timing control 400–68 now proceeds to IT0 and stops.

(b) *Busy input-output modules*.—In all busy *I/O* modules Setup Descriptor syllables are loaded into the Control and Parity Register 400–38 as done in the FNBI *I/O* control module. However, it is loaded into the Control and Parity Register only. The overall parity is checked and if no parity error occurs, the Base Address Register 400–42 is changed to the new address in the sequence, as indicated below.

(1) The descriptor crosspoint signal XPD from the memory module starts the input-output timing control 400–68. Signals DS which enables the input gates to the Descriptor Register 400–48 and signals DTC which is the descriptor transfer control flip-flop which enables the transfer gates between the Descriptor Register 48 and the Output Register 64 cannot be set in these busy *I/O* modules since they are not the first non-busy *I/O* control modules.

(2) At time IT4 the least significant syllable of the Setup Descriptor is loaded into the Control and Parity Register (CPR) 400–38.

(3) At time IT5 a Setup Descriptor order code is detected. The Base Address Control BAC is set and a second syllable of the Setup Descriptor is entered.

(4) At time IT6 the third syllable is entered into the Control and Parity Register CPR.

(5) At time IT7 the new base address in the most significant syllable of the Setup Descriptor is entered into the Control and Parity Register and occupies flip-flops of this register CP1 to CP11.

(6) At time IT8 the parity bit is inserted in the flip-flop CP12.

(7) At time IT9 parity is checked of the overall contents of this register.

(8) At time IT10 the Base Address Register is cleared, if no parity error has occurred.

(9) At time IT11 flip-flop signal ATBAR, which allows transfer into the Base Address Register, will transfer new base address from the Control and Parity Register CPR into the Base Address Register BAR 400–42.

(10) At time IT0 timing control 400–68 stops.

Reiterating, the input-output control module has three general flow paths of information. (1) The descriptor or control flow path, FIG. 6. This is a path common to both input and output directions. It flows from memory into Control Register 400–38, through the Descriptor Register 400–48 and returns to the memory through group of Line Drivers 400–70. It is not necessary that this information be returned to the same location of the memory since it is given a new base address by the Setup Descriptor. (2) The input information flow path, FIG. 7. This path is from a selected one of the thirty-two odd numbered Peripheral Transposers 601, 603 . . . 663 of FIG. 1 through the Input Device Decoder 400–20 to the Information Register 400–46, gated by syllable into Output Register 400–64 and sent to the memory locations indicated by Line Drivers 400–70. (3) The Output Information flow path, FIG. 8. This information is selectively coupled by 12 bit syllables through Gates 400–34 and into the Information Register 400–46. The Output Line Drivers 400–72, fed a character at a time, drive a selected even numbered peripheral device 702, 704 . . . 764, FIG. 1, through its even numbered peripheral transfer 602, 604 . . . 664, FIG. 1.

There are circuits in the IOCM of FIG. 6 which are common to all functions. For example, the terminal equipment and output channel mixer 400–60 receives information not only from the information register 400–46, but also from the descriptor register 400–48. The combined output from this mixer is fed to the Peripheral Equipment Output Data gates 400–66. This information is gated by the Output Selection Device gates 400–22. This selection is accomplished by using five bits 39, 40, 41, 42 and 43 of Descriptor Register 400–48. The use of five lines allows a selection of any one of thirty-two peripherals of either the input or the output type.

The input/output exchange 500 of FIG. 1 does not exist as a separate entity but is comprised of the interconnecting cables between all ten Input/Output control modules 400 and all sixty-four Peripheral Transposers 600.

The Master Control Device 400–68 is essentially a cyclic timing mechanism or clock which is started through a cycle by information from both the Peripheral Devices and the Memory Modules. However, the rate at which the cycles occur is controlled by the Peripheral Device signal. In this way, the Peripheral devices control the rate of cyclic transfer, but the module controls the timing within a cycle. The control device distributes information and timing signals to the memory based on received peripheral and control module information. Conversely, it operates to transmit signals to the control module and the peripherals based on received information from the memory.

Memory Access Request signals (RQ) emanate from this Master Control and Timing Device 400–68. The Read Level (RL) and write level (WL) signals from this device indicates to the requested module the operation to be performed therein.

Summarizing, there has been described a novel input/output system for a data processor which enables the central processor to devote a higher percentage of its time to its fundamental function of information processing. The usual long periods wherein the central processor was required to service input/output peripheral devices has been eliminated. Such periods have been replaced by the time taken to initiate an input/output operation. After initiation, the remainder of the input-output operation is handled by the presently proposed universal input/output control module.

The control module is a bi-directional device which is capable of handling any one of up to sixty-four peripheral devices at one time. Simultaneous peripheral device operation is possible by the addition of more control modules. As many as ten modules may be used on an Input/Output bus. Two *I/O* buses may be used if one of the four presently proposed computer buses is eliminated.

Once an input/output operation has commenced, allowing the transfer of information between the Memory of the machine and the Peripheral Devices, the rate of transfer is controlled by the particular device being utilized. In this way no intermediate buffering device is necessary since the present configuration has an inherent buffer capability.

Further, the present input/output system is capable of selecting the lowest sequentially numbered *I/O* Control Module which is idle. In the event that none are idle, the proposed operation is stored until a module is available.

PERIPHERAL TRANSPOSERS

As has been previously noted, in the general description of the overall input/output system, there exists a need in the present concept for a device which will harmoniously couple the output of the *I/O* exchange 500, FIG. 1, to the inputs of the various peripheral devices 700, FIG. 1. This need is satisfied by devices which will be called Peripheral Transposers 600, FIG. 1. There are three basic types of transposers. This variation in type is imposed by the bi-directional operation required of peripheral devices. Peripheral devices may be categorized as: (1) input peripheral devices which feed information into the computer system; (2) output peripheral devices which receive information from the computer system; and (3) peripheral devices which are a combination of (1) and (2), that is, receive information from as well as transmit information to the computer system. The first type of peripheral transposer, for use with an input type of peripheral device, is referred to as a Simple Input Transposer (FIG. 13). The second, for use with an output peripheral device, is called a Simple Output Transposer (FIG. 14). The third, for use with a peripheral device having bi-directional characteristics, is referred to as a Complex Transposer (FIG. 15).

In view of the numerous and varied terminal devices, FIGURES 13, 14 and 15 do not show detailed control logic for such terminal devices. The figures do, however, give sufficient teaching of the logic necessary to translate the logical interface between the Input/Output Control Module and the transposer device into control levels for altering the device control logic. Within each category, the circuitry is shown to achieve the maximum control flexibility. If less control is required, the logic shown on the drawings can be reduced according to the desired capabilities.

In some cases, it will be desired to have more than one line of communication through the *I/O* exchange 500 of FIG. 1, coupling an IOCM to a particular peripheral device. In such case, it will be possible to have a peripheral transposer of the complex input/input type in which two simple types couple an input in parallel from two or more peripheral transposers 600 to a single line of *I/O* Exchange 500 and hence to a single *I/O* module 400 or of the complex output/output type in which two simple output types couple an output in parallel from an *I/O* module 400 through a single line of the *I/O* Exchange 500 to two or more peripheral transposers 600. However, in normal usage, a complex peripheral transposer will indicate an input/output device. In referring particularly to FIG. 13, it is seen that the output of the start-stop line is fed into the device through an OR gate 627–10. A Character Request signal is applied to OR gate 627–12. The output of OR gate 627–10 and the output of OR gate 627–12 go to OR gate 627–20. Thus, either signal will operate the Single Shot Multivibrator 627–24. Either signal will also operate Inverter 627–22 and thereby remove the Unit Available signal coming from AND gate 627–52.

Referring particularly to FIG. 14, the Simple Output Device referenced at 628 of FIG. 1 is illustrated. On output only devices, the chief concern is to store the descriptor information before sending a Character Strobe signal requesting data. The logic shown in FIG. 14 illustrates the gates and flip-flops involved. The single shot multivibrator 628–24 is triggered by the leading edge of the Start signal from OR gate 628–10 and is used to load the information on the seven write Data lines 628–86, 628–88, 628–90, 628–92, 628–94, 628–96 and 628–98 into the instruction storage flip-flops 628–100, 628–102, 628–104, 628–106, 628–108, 628–110 and 628–112. At the same time it inhibits the Character Strobe signal 628–56 until the sample interval is done by imposing a signal from Inverter 628–48 onto the input of AND gate 628–50.

(3) *Complex devices* (*FIG. 15*).—In order to obtain the complex operations available with a bi-directional device, it is necessary to combine the most complex features from the control for input only device with those of the output only devices. Although FIG. 15 is more complex, it consists of much of FIGS. 13 and 14 with some interconnections. These figures have been drawn in such a way as to emphasize this fact.

FIG. 15 shows the logic needed to have a ninth read command (N, 0–0011). The other eight are obtained by mixing both Start-Stop lines 601–10 and 602–10 to trigger a single shot 602–24, which gates the Write Data Lines AND devices 601/602–86, 88, 92, 94, 96 and 98 with the instruction storage flip-flops 601/602–100, 102, 104, 106, 108, 110 and 112. The four bits of the block field are also available to increase the number of possible commands. The instruction control for write operations is identical to that for output devices, with eight variations instead of seven.

The Status 601/602–58, Unit Available 601/602–54 and Character Strobe 601/602–56 line drivers drive both the read 601 and the write 602 lines. At the *I/O* Control Unit only a read or a write set of three lines are selected.

Status return is identical to that for Input Only Devices except that on write operations, the end of record code 001 unconditionally terminates the operation, while on read operations it terminates only if the block field is zero and counts down the block field otherwise.

Referring again to the FIG. 13, the Simple Input Device, together with the timing chart of the Simple Input Device referred to in FIG. 16, the following signal time relationships must exist.

The two types of input signals indicated on FIG. 13 are the Character Request signals coupled into OR gate 627–12 and the Start/Stop signals coupled into OR gate 627–10. Each input signal type shall be taken as the logical sum of five signals supplied to five fittings mounted on the device. It is guaranteed that no more than one of the five signals associated with a given input will be "1" at the same time.

The transition from "0" to "1" level on the Start/Stop input of the timing FIG. 16 indicates that the device has been connected to the computer system, and is ready to accept the first character. The transition from "1" to "0" indicates that the device has been disconnected from the computer system. Transitions from "0" to "1" will not occur unless the Unit Available output 627–54, FIG. 13, of the device is at its "1" level. The input device shall use this signal as an indication that it must transmit the first character Strobe signal 627–56, FIG. 13, bracketed by data.

The transition from "0" to "1" on the Character Request Input Signal in FIG. 16, indicates that the computer system is ready to accept the next character. The "1" level will be maintained for a minimum of 0.33 microsecond. Normally, the transition from "0" to "1" will occur no sooner than 0.5 microsecond nor later than 1.8 microseconds after the Character Strobe signal 627–56, FIG. 13, goes to the "1" level; however, the delay between the "1" level of the Character Strobe and the "1" level of the Character Request may be indefinite and the device must be prepared to wait. The input device shall use this signal as an indication that it must transmit the next Character Strobe signal, bracketed by data.

There are ten output signals indicated on FIGURE 13. Seven are Data Lines (six data and parity). The Unit Available, Character Strobe, and Status are the remaining three output signals. Each output when switched to the "1" state shall be capable of driving the existing load while maintaining a nominal voltage. When switched to the "0" state, the output voltage shall be nominally zero.

A "1" level on the Unit Available Output Signal of FIG. 16 shall indicate that the input device is capable of transmitting information and is not connected to the computer. Upon receipt of a start level, this output signal shall fall to its "0" level, within one microsecond.

A "1" level on the Character Strobe Output Signal of FIG. 16 shall indicate that a valid character exists on the data outputs. The Character Strobe must not precede data outputs, must be a minimum of 0.4 microsecond in duration and must not extend beyond the data. When at the "0" level, the "0" level must be maintained for a minimum of 0.7 microsecond. The rise and fall times of this output shall be less than 0.5 microsecond. The input device shall generate a Character Strobe signal as quickly as possible after receiving a "1" level on the Start/Stop Signal line; thereafter, the input device shall generate a Character Strobe as quickly as possible after receiving a "1" level on the character request signal line. The Maximum repetition rate of the Character Strobe signal is 500 kc.

The Status Output Signal, FIG. 16, is functionally identical to the Character Strobe Signal. The presence of either the Status Signal or Character Strobe indicates that valid data exists on the data lines. The timing specifications for the Character Strobe apply equally to the Status signal. If both the Status Signal and Character Strobe appear simultaneously, the data on the data lines is interpreted as both a Status Code and a Data Character. Some of these codes indicate to the computer system that the Input Operation is to be terminated. The operation will then be terminated by the computer system by placing a "0" level on the Start/Stop Signal line.

The input device will generate seven data output signals, FIG. 16; six of these shall represent Data and the seventh shall be generated so as to make the overall parity odd. Data must be maintained on these lines for a minimum of 0.7 microsecond, existing at the start of the "1" level of the Character Strobe, and remaining for a minimum of 0.7 microsecond thereafter. Data may be placed on the lines anytime after the transition of the Start/Stop signal from the "0" to the "1" level, or upon receipt of a Character Request Signal within the timing limitation of the 500 kc. maximum character rate.

An Interrupt Request Output Signal (not shown) is provided if it is necessary for the device to request the establishment of an input operation. This output signal shall be maintained at the "0" level unless the input device wishes to be connected to the computer system. In this case, a "1" level shall be generated and maintained on this output until an indeterminate time later when a start level will be transmitted to the device. The interrupt request output shall then be returned to the "0" level within 1.0 microsecond of receipt of the start level.

Next, refer to FIG. 14, the Simple Output Transposer Device together with FIGURE 17, its timing signal representations.

There are three output signals from the Simple Output Transposer of FIGURE 14. Each output when switched to the "1" state shall be capable of driving the load while maintaining a nominal voltage. When switched to the "0" state, the output voltage shall be nominally zero.

On the Unit Available Output Signal, FIGURE 17, a "1" level indicates that the device is servicable and not in use; a "0" level indicates that the device is not servicable or is in use; a device in good working order shall maintain a "1" level on this output until the receipt of a Start Level at which time it shall change to a "0" level within 1 microsecond of receipt of the Start level. This "0" must be maintained until the receipt of a Stop Level.

The transition from "0" to "1" level of the Character Request Output Signal, FIGURE 17, indicates that the device is prepared to accept a Character Strobe Signal. After receipt of this Character Strobe Signal, the Data Lines may be read. The Character Request "1" Level must be a minimum of 0.14 microsecond in duration. When at the "0" level, the "0" level must be maintained for a minimum of 0.7 microsecond. The transitions are determined by the operation of the Output Peripheral Device, thus allowing the device to control the rate of output (500 kc. maximum). A transition once begun, must be completed within 0.5 microsecond.

A "0" level on the Status Signal which is the third output signal, indicates that output communication is proceeding properly. A "1" level indicates that the device has detected a parity error or malfunction and is no longer capable of properly handling outputs. Output will be terminated shortly thereafter. Where the termination is caused by detection of a parity error or malfunction, the Unit Available Output Signal should go to a "1" level after receipt of the Stop level. Rise time of the Status Signal shall be less than 0.5 microsecond. The Status Signal shall terminate when the device receives the Stop level.

There are nine input signals to the Output Transposer of FIGURE 14. Each input shall be taken as the logical sum of five signals. It is guaranteed that no more than one of the five signals associated with a given input will be a "1" at the same time.

The transition from "0" to "1" level on the Start/Stop Input shown in FIGURE 17, shall initiate the output operation while the reverse transition shall terminate it. The Output Peripheral device shall use this signal as an indication that it must transmit the first Character Request Signal.

On the character Strobe Signal of FIGURE 17, a "1" level indicates that valid data exists on the data lines. The transition from "0" to "1" on this line occurs in response to a Character Request Signal from the Peripheral Device. The Character Strobe Signal will be a minimum of 0.3 microsecond in duration. Normally, the transition from "0" to "1" will occur no sooner than 0.5 microsecond or no later than 1.8 microseconds after the Character Request goes to the "1" level, however, the delay between the "1" level of the Character Request and the "1" level of the Character Strobe Line may be indefinite and the service must be prepared to wait. The output device shall also use this signal as an indication that it may transmit the next Character Request Signal.

The remaining seven of the nine input signals of FIG-

URE 14 are represented as one line on FIGURE 17; a second bit data word will appear on these inputs for a minimum of 1.0 microsecond starting 0.33 microsecond prior to the start of the "1" level of the Character Strobe Signal, and remaining for 0.33 microsecond after the fall of the Character Strobe. Six bits of data word represent the character, and the seventh is such to make the overall parity odd.

PERIPHERAL DEVICES

Ordinarily, the peripheral devices associated with this system are standard Data Processing peripheral devices. For example, Readers, Punches, High Speed Printers, and various storage devices—Drum, Tapes, or Discs.

One important peripheral feature of the present concept that should be noted is the ability of this Input/Output system to control the Data Processing System from one of the peripheral storage devices. That is, it is possible to have a control program stored on one of the peripheral devices rather than in the main memory and have such a program be fed into the input/output system and control program execution of the Data Processing System.

While there have been shown and described and pointed out the fundamental novel features of the invention as applied to the preferred embodiment, it will be understood that various omissions and substitutions and changes in the form and details of the device illustrated and in its operation may be made by those skilled in the art without departing from the spirit of the invention. It is the intention, therefore, to be limited only as indicaed by the scope of the following claims.

What is claimed is:

1. In a data processing system having a memory means, and an information processing means coupled thereto, the combination comprising; a plurality of input/output peripheral control devices having first connecting means for coupling to said memory means, a plurality of interface transposing means, a matrix interconnection means connected between a second connecting means on each of said plurality of input/output peripheral control devices and said plurality of interface transposing means, and a plurality of peripheral devices each individually connected to appropriate ones of said plurality of interface transposing means.

2. In a data processing system having a memory means, a plurality of substantially identical input output peripheral control devices coupled thereto and a plurality of unidirectional and bidirectional peripheral devices having non-uniform coupling connections, the combination comprising: a plurality of interface transposing devices, interconnecting means providing an electrical path between any one of said control devices and a selected one of said transposing devices, said transposing devices enabling harmonious interconnection between any one of said substatially identical control devices with the non-uniform coupling connections of a selected one of said peripheral devices.

3. The combination as set forth in claim 2 in which said each of said plurality of interface transposing devices has a first and a second set of coupling connections, said first set of connections being of a fixed number and type and presenting a fixed impedance to any device coupled thereto, said second set of connections being of a variable number and type to accommodate various types or peripheral devices, said first set being arranged for coupling to said control devices and said second set being arranged for coupling to said peripheral devices.

4. The combination as set forth in claim 3 in which said plurality of transposing devices include a first and second configuration of unidirectional operational device, said first configuration having a single operational direction toward said fixed number and type coupling connections, and said second configuration having a single operational direction toward said set of variable number and type coupling connections, said first configuration arranged to couple information from appropriate unidirectional peripheral devices into said control devices and said second configuration arranged to couple information from said control devices to appropriate unidirectional peripheral devices.

5. The combination as set forth in claim 4 in which said plurality of transposing devices include a bidirectional configuration having two sets of fixed number and type and one set of variable number and type coupling connections, said bidirectional configuration arranged to couple information to and from an appropriate bidirectional peripheral device to and from said control devices.

6. The combination as set forth in claim 5 in which one of said plurality of peripheral devices is capable of being utilized as a system control device enabling control of the data processing system from the physical location of said peripheral device.

7. The combination as set forth in claim 6 in which said control peripheral device is a type of storage means enabling executive control programs to be placed therein, allowing automatic control of the data processing system from said selected peripheral device.

8. In a data processing system having a memory means and a plurality of peripheral devices, the combination comprising: a plurality of input/output peripheral control devices each having first and second terminal means for respective coupling between said memory means and said plurality of peripheral devices, each of said plurality of input/output peripheral control devices having means for assigning its individual identification to selected information routed therethrough, and indicating means providing its present operating condition.

9. In a data processing system having a memory means and a plurality of peripheral devices, the combination comprising: a plurality of input/output peripheral control devices each having first and second terminal means for respective coupling between said memory means and said plurality of peripheral devices, each of said plurality of input/output peripheral control devices having individual identification and present operational condition indicating means associated with each of said devices, said present operational condition indicating means including position indicating means for identifying the relative location of each of said control devices in an idle list of said plurality of input/output peripheral control devices.

10. In a data processing system having a multi-access memory means, the combination comprising: a plurality of input/output peripheral control modules, each of which is selectively connectable to individual ones of said peripheral devices and to said multi-access memory means for controlling the execution of different input/output instructions having a predetermined order of priority, and priority selection resolving means associated with said control modules and effective, when all of the latter are executing input/output instructions, to identify which of the control modules is currently executing the input/output instruction with the lowest priority, and to terminate its execution and free a control module when the system requires the execution of a higher priority input/output instruction; said priority selection resolving means being constructed and arranged so as to store the lowest priority input/output instruction for execution at a later time and to thereafter cause the freed control module to execute the higher priority instruction.

11. In a data processing system having a memory means, a processing means coupled thereto, and a plurality of peripheral devices, the combination comprising: at least one input/output peripheral control device having first and second terminal means for respective coupling between said plurality of peripheral devices and said memory means, said input/output peripheral control device having means to receive, store, execute, and modify an input/output instruction for return to a memory location in said memory means as specified by such modification.

12. In a data processing system having a memory means and a plurality of peripheral devices, the combination comprising at least one input/output peripheral control device each having first and second terminal means for respective coupling between said memory means and said plurality of peripheral devices, said at least one input/output peripheral control device having means to receive a command instruction word, said instruction word including a control device status portion, means within said control device for modifying said status portion to provide information to said memory means as to the operational status of said control device, further means to transfer and prepare said modified instruction word for return to said memory means for storage and reference use.

13. In a data processing system having a memory means and a plurality of peripheral devices, the combination comprising at least one input-output peripheral control device each having first and second terminal means for respective coupling between said memory means and said plurality of peripheral devices, each of said plurality of peripheral devices having means associated with it to impose modifying information concerning its operational status upon selected information being routed to said control device from each of said plurality of peripheral devices means and further means within said Input/Output Control Device for thereafter transferring certain modified information to said memory means for storage and reference use.

14. In a data processing input/output peripheral device selection system, the combination comprising: at least one input/output peripheral control device having a plurality of sets of input and an equal plurality of sets of output communicating means, said peripheral control device having means to select any one of said plurality of sets of input or output communicating means utilizing a plurality of data digits equal to one more than said plurality of sets of input communicating means.

15. In a data processing system having a plurality of unidirectional input, unidirectional output, and bidirectional peripheral devices, the combination comprising: at least one input/output peripheral control device, a plurality of identical interconnecting cables alternately comprised of unidirectional input and unidirectional output cables for coupling said input/output peripheral control device to said plurality of peripheral devices.

16. In a data processing system having a multi-access memory means containing input and output command instruction words and information data words, the combination comprising: an input/output peripheral control device having first and second terminal means for respective coupling between said multi-access memory means and the peripheral devices of said data processing system, said input/output peripheral control device having a main bidirectional information data register capable of storing a plurality of information segments associated with an input information data control means, and an output information data control means commonly sharing said bidirectional information data register, and an auxiliary bidirectional information data register associated with said main bidirectional information data register in an input direction to normally store and serially transfer successively received information segments and at a predetermined time to simultaneously transfer a plurality of said information segments of input information data words being transferred into said main bidirectional information register, said auxiliary bidirectional data register associated with said main bidirectional data register in an output direction at a predetermined time to simultaneously receive a plurality of said information segments of output information data words being transferred out of said main bidirectional information register enabling said input/output control device to accept a new information segment transfer in either direction prior to the time it has completely transferred a present one.

17. The combination as set forth in claim 16 in which each portion of said information data word routed through said control device corresponds to a character segment, in an input operation said data word entering said main register from peripheral devices serially by character segments and leaving said main register successively by groups of character segments for system utilization, and in an output operation said data word entering said main register from system storage successively by groups of character segments and leaving said main register, for utilization by peripheral devices, serially by character segments.

18. An electrical control device for controlling flow of information data comprising: a main storage register having a serial and a parallel input and a serial and parallel output, an auxiliary register having a smaller storage capacity than said main register, said auxiliary register having a serial input as well as a serial and a parallel output, means for normally interconnecting said serial output of said auxiliary register to said serial input of the main register, and further means at a predetermined time interconnecting said parallel output of said auxiliary register to said parallel input to enable an overlap in operation of input data transfer.

19. A control device as recited in claim 18 wherein said information data is comprised of discrete words, each word including a plurality of character segments, means for directing said character segments serially into the input of said auxiliary register at a first transfer rate, further means for directing said character segments successively out of said parallel output of said main register at a second transfer rate in groups, each group having more than one character segment, said first and second transfer rates being independently determined.

20. An electrical control device for controlling a flow of information data comprising: a main storage register having an input for receiving data words, each word including a plurality of character segments, means for directing groups of said character segments successively into the input of said main register, each group having more than one character segment being simultaneously received, said main register having output means, an auxiliary register having a smaller storage capacity than said main register, said auxiliary register having a parallel input and an output means, means for serially transferring data out of said main storage means in character segments, further means at a predetermined time for simultaneously transferring out of said main register a plurality of said character segments for entry into the parallel input of said auxiliary register for storage until directed out of the output means of said auxiliary register serially by character segments.

21. In a data processing system, at least one peripheral control device, each having first and second terminal means for respective coupling between the system memory and the peripheral devices being responsive to peripheral command instructions comprising: a plurality of input paths for receiving command instruction words and information data words, said command instruction words each including an address portion and an instruction portion, an input means for selecting one of said input paths, a syllable length control/parity register to receive and store each syllable until replaced by the next syllable of the entire command word, a command instruction register to receive and store said entire command word, an information register for receiving information data words from a selected one of said input paths, said information register having an output means for directing said data words to a selected peripheral device under control of said command instruction word, and means for coupling said instruction word out of said peripheral control device.

22. In a data processing system, at least one peripheral control device, each having first and second terminal means for respective coupling between the system memory and the peripheral devices being responsive to peripheral command instructions comprising: a plurality of input paths for receiving command instruction words and information data words, said command instruction words each including an address portion and an instruction portion, an input means for selecting one of said input paths, a control/parity register to receive a part of said command word, a command instruction register to receive said entire command word, an information register having means for selecting one of a plurality of input paths for receiving information data words from a plurality of peripheral devices, the selection of said peripheral device input path and the information transfer being under the control of said command instruction word, said information register having output means, and additional output means associated with said peripheral control device for transferring in appropriate time sequence along common paths said information data and said command instruction out of said peripheral control device to appropriate memory means.

23. An input/output control device for a data processing system comprising: storage input selection means for receiving command words and data words, a peripheral device input selection means, a command word storage means to receive the selected command word, a data word storage means, selective coupling means to couple data from said storage input selection means and from a selected input peripheral device to said data word storage means on output and input operations, respectively, under control of said selected command word, output selection means to provide a first output path of said data word storage means and a second output path of said data word storage means on input and output operations, respectively, also under control of said selected command word, further output selection means to provide an output path in common with said first output path from said command word storage means on both of said input and output operations.

24. An input/output system for a data processor having at least one Input/Output peripheral control device and a plurality of peripheral devices, each of said peripheral devices having means associated with it to control the communication transfer rate between said peripheral device and said at least one *I/O* peripheral control device, and said at least one peripheral control device having means for transferring said control to said associated means.

25. The claim as set forth in claim 24 in which the means associated with each of said plurality of peripheral devices to control the transfer rate is a unidirectional transposing device having means to cause an Input/Output peripheral control device to transfer its available data to said peripheral device associated with said transposing device.

26. The claim as set forth in claim 25 in which the interface transposing is of the opposite unidirectional configuration having means to cause an input/output peripheral control device to accept data available from the peripheral device associated with said interface transposing device.

27. The claim as set forth in claim 26 in which the interface transposing device is of a bidirectional configuration having means to cause available data to flow in either direction between a pair of said input/output peripheral control devices and an appropriate bidirectional peripheral device.

References Cited by the Examiner

UNITED STATES PATENTS

| | | | |
|---|---|---|---|
| 3,029,414 | 4/1962 | Schrimpf | 340—172.5 |
| 3,061,192 | 10/1962 | Terzian | 340—172.5 |
| 3,079,082 | 2/1963 | Scholten | 340—172.5 |
| 3,158,844 | 11/1964 | Bowdle | 340—174.1 |
| 3,181,124 | 4/1965 | Hammel | 340—172.5 |
| 3,200,380 | 8/1965 | MacDonald | 340—172.5 |
| 3,201,760 | 8/1965 | Schrimpf | 340—172.5 |

ROBERT C. BAILEY, *Primary Examiner.*

P. L. BERGER, *Assistant Examiner.*